(12) United States Patent
Tsuzaki et al.

(10) Patent No.: US 8,066,337 B2
(45) Date of Patent: Nov. 29, 2011

(54) WHEEL SUPPORTING SYSTEM

(75) Inventors: Youichi Tsuzaki, Kashiba (JP); Yutaka Matsuno, Nara (JP); Yoshito Takada, Nara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 202 days.

(21) Appl. No.: 12/448,550

(22) PCT Filed: Dec. 27, 2007

(86) PCT No.: PCT/JP2007/075149
§ 371 (c)(1),
(2), (4) Date: Jun. 25, 2009

(87) PCT Pub. No.: WO2008/081879
PCT Pub. Date: Jul. 10, 2008

(65) Prior Publication Data
US 2010/0038958 A1    Feb. 18, 2010

(30) Foreign Application Priority Data

Dec. 28, 2006  (JP) .................................. 2006-355121
Jan. 22, 2007  (JP) .................................. 2007-011382
Mar. 29, 2007  (JP) .................................. 2007-087875

(51) Int. Cl.
*B60B 35/14*    (2006.01)

(52) U.S. Cl. ..................... 301/105.1; 384/544; 384/589; 464/178

(58) Field of Classification Search ............... 301/105.1, 301/125; 29/898.07; 384/448, 544, 589; 277/634; 464/178, 904, 906
See application file for complete search history.

(56) References Cited

U.S. PATENT DOCUMENTS

| 4,460,058 | A | 7/1984 | Welschof et al. |
| 4,893,960 | A | 1/1990 | Beier et al. |
| 5,975,765 | A | 11/1999 | Kawamura |
| 6,146,022 | A | 11/2000 | Sahashi et al. |
| 6,267,509 | B1 | 7/2001 | Morimura |
| 7,118,182 | B2 * | 10/2006 | Kayama et al. ............ 301/105.1 |
| 7,553,087 | B2 | 6/2009 | Iwamoto et al. |
| 7,621,817 | B2 * | 11/2009 | Cermak ........................ 464/178 |

FOREIGN PATENT DOCUMENTS

| JP | 63-184501 | 7/1988 |
| JP | 1-149802 | 10/1989 |
| JP | 6-50350 | 2/1994 |
| JP | 9-288117 | 11/1997 |

(Continued)

*Primary Examiner* — Kip T Kotter
(74) *Attorney, Agent, or Firm* — McGinn IP Law Group, PLLC

(57) ABSTRACT

An outer ring shaft portion which is extended integrally from an end face of an outer ring of a constant velocity joint is fittingly inserted into an inside hole in a hub shaft of a wheel hub, so that the wheel hub and the constant velocity joint are coupled to each other. Internal splines and external splines are formed on an inner circumferential surface of the inside hole in the hub shaft and an outer circumferential surface of the outer ring shaft portion in such a manner as to mesh with each other. Side face splines are formed on end face of the hub shaft and an end face of the outer ring of the constant velocity joint. The wheel hub and the constant velocity joint are connected together in such a manner that torque can be transmitted therebetween.

15 Claims, 15 Drawing Sheets

FOREIGN PATENT DOCUMENTS

| | | |
|---|---|---|
| JP | 10-297207 | 11/1998 |
| JP | 11-23600 | 1/1999 |
| JP | 11-240306 | 9/1999 |
| JP | 2000-19190 | 1/2000 |
| JP | 2002-114004 | 4/2002 |
| JP | 2002-122445 | 4/2002 |
| JP | 2002-172909 | 6/2002 |
| JP | 2002-178705 | 6/2002 |
| JP | 2002-214245 | 7/2002 |
| JP | 2003-97588 | 4/2003 |
| JP | 2005075229 A * | 3/2005 |
| JP | 2005-140146 | 6/2005 |
| JP | 2005-170208 | 6/2005 |
| JP | 2006-57817 | 3/2006 |
| JP | 2007-62647 | 3/2007 |
| WO | WO 2006092121 A1 * | 9/2006 |

* cited by examiner

WHEEL SUPPORTING SYSTEM

TECHNICAL FIELD

The present invention relates to a wheel supporting system in which an outer ring shaft portion which is extended integrally from an end face of an outer ring of a constant velocity joint is fittingly inserted into an inside hole in a hub shaft of a wheel hub to which a wheel is attached so that the wheel hub and the constant velocity joint are coupled to each other.

BACKGROUND ART

This type of wheel supporting system is disclosed in, for example, Patent Document 1.

In this wheel supporting system, as is shown in FIG. 22, a double row angular ball bearing 120 as a rolling bearing which includes an inner ring 121, an outer ring 130 and balls (rolling elements) 141, 142 is assembled to an outer circumferential surface of a hub shaft 113 of a wheel hub 110.

On the other hand, on an outer ring 160 of a constant velocity joint 150 to which an end portion of a drive shaft 151 is coupled, an outer ring shaft 163 is extended integrally from an end face 162 of an outer ring shaft 161 thereof.

In addition, internal splines 114 are formed on an inner circumferential surface of an inside hole in the hub shaft 113 of the wheel hub 110, and external splines 164 are formed on an outer circumferential surface of the outer ring shaft portion 163 in such a manner as to mesh with the internal splines 114.

In addition, the outer ring shaft portion 163 is fittingly inserted into the inside hole in the hub shaft 113 of the wheel hub 110 while the internal and external splines 114, 164 are being caused to mesh with each other, and by a fastening nut 166 being fastened on to a male thread portion 165 which is caused to project from a distal end of the outer ring shaft portion 163, the wheel hub 110 and the constant velocity joint are connected together in such a manner that torque can be transmitted therebetween.

Patent Document 1: JP-A-2002-114004

DISCLOSURE OF THE INVENTION

Problem that the Invention is to Solve

Incidentally, in the wheel supporting system disclosed in Patent Document 1, while the vehicle is running, the torque of the outer ring shaft portion 163 of the constant velocity joint 150 which rotates in the same direction as the drive shaft 151 is transmitted to the wheel hub 10 through meshing between the internal and external splines 114, 164, whereby wheels are driven to rotate.

As this occurs, in such a case that a large magnitude of torque which exceeds what is anticipated is applied particularly as when the vehicle is started abruptly, a relative slippage (a slippage including twist) is generated at a contact plane between the end face 162 of the outer ring 160 of the constant velocity joint 150 and an end face (an end face of a crimped portion 117) of the hub shaft 113 of the wheel hub 110, and there may result in a case where abnormal noise is generated.

In view of the problem described above, an object of the invention is to provide a wheel supporting system which can suppress a relative slippage between an end face of a constant velocity joint and an end face of a hub shaft of a wheel hub, so as to prevent the generation of abnormal noise which is caused by the relative slippage occurring at the relevant portion.

Means for Solving the Problem

In order to achieve the object, a wheel supporting system according to a first aspect of the invention comprises:

a wheel hub which includes a hub shaft defining an inside hole therein and to which a wheel is to be attached; and a constant velocity joint which includes an outer ring having an outer ring shaft portion extended integrally from an end face of the outer ring, wherein the wheel hub and the constant velocity joint are coupled together by the outer ring shaft portion being fittingly inserted into the inside hole of the hub shaft, wherein internal splines and external splines are formed on an inner circumferential surface of the inside hole of the hub shaft and an outer circumferential surface of the outer ring shaft portion, respectively, in such a manner as to mesh with each other, wherein side face splines are formed on an end face of the hub shaft and an end face of the outer ring of the constant velocity joint, respectively, in such a manner as to mesh with each other, and wherein the wheel hub and the constant velocity joint are coupled together in such a manner that torque can be transmitted between the wheel hub and the constant velocity joint by the internal and external splines and the side face splines meshing with each other, respectively.

According to the configuration described above, while the vehicle is running, the torque of the outer ring shaft portion of the constant velocity joint which rotates in the same direction as the drive shaft is transmitted to the wheel hub through meshing between the internal and external splines formed respectively on the inner circumferential surface of the inside hole of the hub shaft and the outer circumferential surface of the outer ring shaft portion, and the same torque is also transmitted to the wheel hub through meshing of the side face splines on the end face of the hub shaft and the end face of the outer ring of the constant velocity joint, whereby wheels are driven to rotate.

In this way, the torque on the constant velocity joint side can be transmitted well to the wheel hub side through the meshing between the internal and external splines, as well as meshing between the side face splines.

Because of this, being different from the related art, the relative slippage between the end face of the outer ring of the constant velocity joint and the end face of the hub shaft of the wheel hub can be suppressed so as to prevent the generation of abnormal noise.

The wheel supporting system according to a second aspect of the invention comprises:

a hub shaft of a wheel hub to which a wheel is to be attached; and an outer ring of a constant velocity joint which is coupled to the hub shaft in such a manner that torque can be transmitted therebetween, wherein a radially inner side annular portion and a radially outer side annular portion are provided both on an end face of the hub shaft and an end face of the outer ring of the constant velocity joint which is brought into abutment with the end face of the hub shaft, wherein side face splines are formed individually on either annular portions of the radially inner side annular portions and the radially outer side annular portions in such a manner as to mesh with each other so that the wheel hub and the outer ring of the constant velocity joint can be coupled together in such a manner that torque can be transmitted between the wheel hub and the constant velocity joint, and wherein flat surfaces are formed individually on the other annular portions in such a manner as to be brought into close contact with each other so as to form an annular seal portion.

According to the configuration described above, while the vehicle is running, the torque of the outer ring of the constant velocity joint which rotates in the same direction as the drive shaft is transmitted to the wheel hub through meshing between the side face splines which are formed on either annular portions of the radially inner side annular portions and the radially outer side annular portions of the end face of the hub shaft and the end face of the outer ring of the constant velocity joint, whereby the wheels are driven to rotate.

In this way, the torque on the constant velocity joint side can be transmitted well to the wheel hub side through the meshing between the side face splines.

Because of this, being different from the related art, the relative slippage between the end face of the outer ring of the constant velocity joint and the end face of the hub shaft of the wheel hub can be suppressed, so as to prevent the generation abnormal noise.

Moreover, since the annular seal portion is realized by the close contact between the flat surfaces which are formed individually on the other annular portions of the radially inner side annular portions and the radially outer side annular portions of the end face of the hub shaft and the end face of the outer ring of the constant velocity joint, the intrusion of muddy water or the like can be prevented by the annular seal portion so formed.

For example, in the event that the end face of the hub shaft and the end face of the outer ring of the constant velocity joint are coupled together over the whole area of the abutment plane therebetween through the meshing between the side face splines, there is caused a fear that muddy water or the like intrudes into an interior of the wheel supporting system from clearances in the meshing portion between the side face splines to thereby generate rust. However, the annular seal portion is realized by the close contact of the respective flat surfaces of the other annular portions, thereby making it possible to prevent the intrusion of muddy water or the like.

According to a third aspect of the invention, in the wheel supporting system of the second aspect of the invention, the side face splines are formed individually on the radially inner side annular portions of the end face of the hub shaft and the end face of the outer ring of the constant velocity joint, and the flat surfaces portions are formed individually on the radially outer side annular portions in such a manner as to form the annular seal portion.

According to the configuration described above, by the annular seal portion being configured by the flat surfaces formed individually on the radially outer side annular portions, muddy water or the like can be prevented from reaching the clearances in the meshing portion between the side face splines on the radially inner side annular portions. Because of this, the rusting of the side face splines can be prevented which would otherwise be caused by the intrusion of muddy water or the like thereto.

A wheel supporting system according to a fourth aspect of the invention comprises:

a hub shaft of a wheel hub to which a wheel is to be attached; and an outer ring of a constant velocity joint which is coupled to the hub shaft in such a manner that torque can be transmitted therebetween, wherein side face splines are formed individually on end face of the hub shaft and an end face of the outer ring of the constant velocity joint which is brought into abutment with the end face of the hub shaft in such a manner as to mesh with each other so that the wheel hub and the outer ring of the constant velocity joint can be coupled together in such a manner that torque can be transmitted between the wheel hub and the constant velocity joint, wherein a cover member is mounted between an outer ring of a rolling bearing which is installed on an outer circumference of the hub shaft and the outer ring of the constant velocity joint in such a manner as to cover a meshing portion between the side face splines and a clearance defined between both the outer rings for sealing, wherein a vehicle speed detector is disposed on the cover member or a vehicle body side member, and wherein a pulser ring is installed in an interior of the cover member in such a manner as to face a detecting portion of the vehicle speed detector.

According to the configuration described above, while the vehicle is running, the torque of the outer ring of the constant velocity joint which rotates in the same direction as the drive shaft is transmitted to the wheel hub through meshing between the side face splines which are formed individually on the end face of the hub shaft and the end face of the outer ring of the constant velocity joint, whereby the wheels are driven to rotate.

In this way, the torque on the constant velocity joint side can be transmitted well to the wheel hub side through the meshing between the side face splines.

Because of this, being different from the related art, the relative slippage between the end face of the outer ring of the constant velocity joint and the end face of the hub shaft of the wheel hub can be prevented so as to prevent the generation of abnormal noise.

In addition, the meshing portion between both the side face splines and the clearance between both the outer rings can be covered to be sealed by the cover member which is mounted between the outer ring of the rolling bearing of the hub shaft side and the outer ring of the constant velocity joint. Because of this, the rusting of the interior of the rolling bearing on the hub shaft side or of the meshing portion between both the side face splines can be prevented which would otherwise be caused by the intrusion of muddy water or the like which is splashed by the wheels of the vehicle while it is running into those relevant portions.

Additionally, by the pulser ring for the vehicle speed detector being installed in the interior of the cover member, the pulser ring can be protected from muddy water, dust or the like.

According to a fifth aspect of the invention, in the wheel supporting system of the fourth aspect of the invention, the cover member comprises:

a core metal including a cylindrical portion which is fittingly press fitted in an inner circumferential surface of the outer ring of the rolling bearing of the hub shaft, and an annular portion which projects from an end portion of the cylindrical portion towards an outer circumferential surface of the outer ring of the constant velocity joint; and an elastic seal material which is joined integrally to the annular portion of the core metal and includes a distal end portion brought into close contact with the outer circumferential surface of the outer ring of the constant velocity joint.

According to the configuration described above, since the cylindrical portion of the core metal is fittingly press fitted on the outer ring of the rolling bearing of the hub shaft, the intrusion of muddy water or the like from the relevant portion can be prevented well.

In addition, by the distal end portion of the elastic seal material which is joined integrally to the annular portion of the core metal being brought into close contact with the outer circumferential surface of the outer ring of the constant velocity joint, the intrusion of muddy water or the like from the relevant portion can be prevented well.

According to a sixth aspect of the invention, in the wheel supporting system of the fifth aspect of the invention, an insertion hole which corresponds to the detecting portion of the vehicle speed detector is formed in a cylindrical portion of the core metal of the cover member, and the detecting portion comes close to an outer circumferential surface of the pulser ring by inserting the detecting portion of the vehicle speed detector into the insertion hole so as to be mounted on the cylindrical portion of the core metal.

According to the configuration described above, the cover member can double as a mounting member of the vehicle speed detector and the alignment of the detecting portion of the vehicle speed detector with the pulser ring can be implemented easily and accurately.

According to a seventh aspect of the invention, in the wheel supporting system of the fifth aspect of the invention, the core metal of the cover member is formed of a non-magnetic material, the detecting portion of the vehicle speed detector is installed to lie close to an outer circumferential surface of the cylindrical portion of the core metal, and the pulser ring made up of a magnetized ring is installed in a position which corresponds to the detecting portion of the vehicle speed detector and in such a manner as to lie close to an inner circumferential surface of the cylindrical portion of the core metal.

According to the configuration described above, since the necessity can be obviated of opening an insertion hole for the detecting portion of the detector in the cylindrical portion of the metal core of the cover member, an increase in sealing properties can be realized.

According to an eighth aspect of the invention, in the wheel supporting system of the fourth to seventh aspects of the invention, side face splines are formed individually on either annular portions of the radially inner side annular portions and the radially outer side annular portions in such a manner as to mesh with each other so that the wheel hub and the outer ring of the constant velocity joint can be coupled together in such a manner that torque can be transmitted between the wheel hub and the constant velocity joint, and flat surfaces are formed individually on the other annular portions in such a manner as to be brought into close contact with each other so as to form an annular seal portion.

According to the configuration described above, by the annular seal portion being configured through the close contact between the flat surfaces which are formed individually on the other annular portions of the inside diameter annular portions and the outside diameter annular portions on the end face of the hub shaft and the end face of the outer ring of the constant velocity joint, even in case a failure in sealing by the cover member occurs unexpectedly, resulting in the intrusion of muddy water or the like into the interior of the wheel supporting system, the intrusion of muddy water or the like into a deeper portion can be prevented by the annular seal portion.

DESCRIPTION OF REFERENCE NUMERALS

10 wheel hub; 11 flange; 13 hub shaft; 14 internal spline; 17 crimped portion; 20 double row angular ball bearing (rolling bearing); 50 constant velocity joint; 60 outer ring; 62 end face; 63 outer ring shaft portion; 64 external spline; 71, 76 side face spline; 73, 78 (73a, 78a) flat surface; 80 cover member; 81 core metal; 82 cylindrical portion; 83 annular portion; 85 elastic seal material; 90 vehicle speed detector; 91 detecting portion; 98 pulser ring

BEST MODE FOR CARRYING OUT THE INVENTION

Next, a best mode for carrying out the invention will be described in accordance with embodiments.

Embodiment 1

Embodiment 1 of the invention will be described in accordance with FIGS. 1 to 3.

Figure 1:
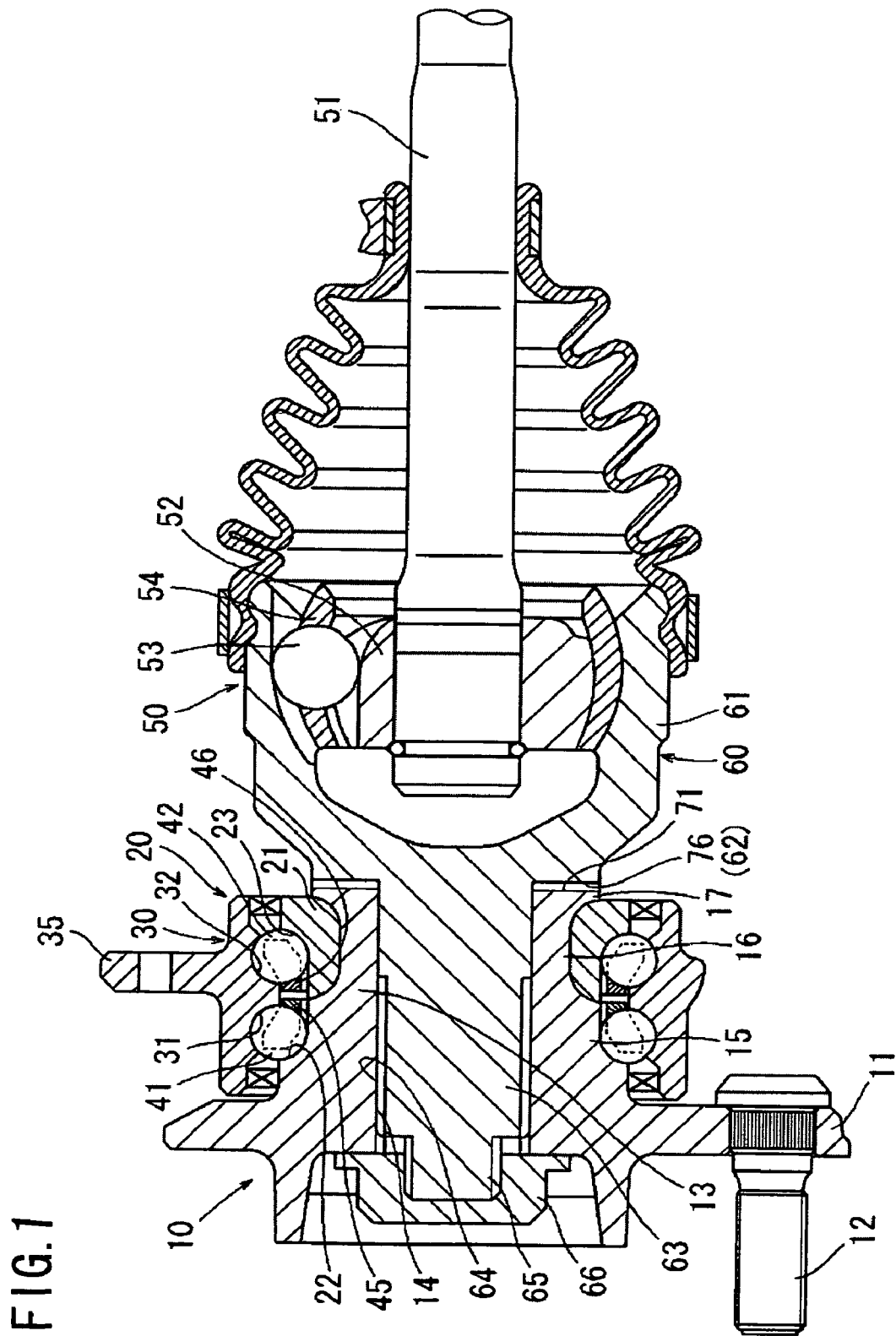
FIG. 1 is a side sectional view showing a wheel supporting system according to Embodiment 1 of the invention.

FIG. 1 is a side sectional view showing a wheel supporting system according to Embodiment 1 of the invention. FIG. 2 is a sectional view showing a state in which a hub shaft of a wheel hub and an outer ring shaft portion of a constant velocity joint are connected together through individual meshing between internal and external splines and between side face splines. FIG. 3 is a cross-sectional view showing the outer ring shaft portion which is extended integrally from an end face of an outer ring of the constant velocity joint.

As is shown in FIG. 1, a wheel supporting system of Embodiment 1 includes a wheel hub 10, a double row angular ball bearing 20 as a rolling bearing, and a constant velocity joint 50.

Figure 2:
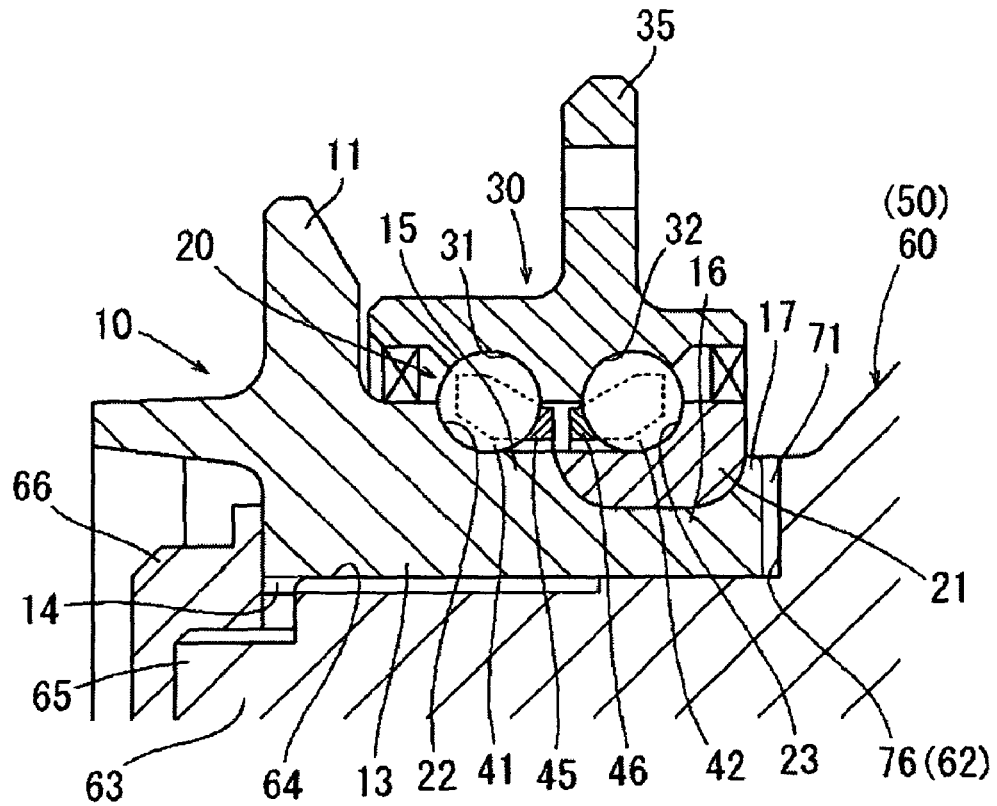
FIG. 2 is a sectional view showing a state in which a hub shaft of a wheel hub and an outer ring shaft portion of a constant velocity joint of Embodiment 1 of the invention are connected together through individual meshing between internal and external splines and between side face splines.

As is shown in FIGS. 1 and 2, the wheel hub 10 has integrally a cylindrical hub shaft 13 and a flange 11 which is formed on an outer circumferential surface of the hub shaft 13 in a position which lies closer to one end thereof. In addition, a plurality of hub bolts 12 for mounting a wheel (not shown) on the flange 11 with a brake rotor (not shown) interposed therebetween are fixed to the flange 11 at predetermined intervals through press fitting.

The double row angular ball bearing 20, which includes the outer ring 30, the inner ring 21, pluralities of balls 41, 42 as rolling elements, and cages 45, 46, is assembled on to an outer circumference of the hub shaft 13.

In Embodiment 1, the hub shaft 13 has integrally a large diameter shaft portion 15 which is formed on the flange 11 side and a small diameter shaft portion 16 which is formed in such a manner as not only to be smaller in diameter as required than the large diameter shaft portion 15 but also to be continued from the large diameter shaft portion 15 via a rising surface. In addition, a raceway surface 22 is formed on an outer circumferential surface of the large diameter shaft portion 15 in such a manner as to correspond to one raceway surface 31 of raceway surfaces of the outer ring 30.

Further, after the inner ring 21 on an outer circumferential surface of which a raceway surface 23 which corresponds to the other raceway surface 32 of the outer ring 30 is fitted on the small diameter shaft portion 16 of the hub shaft 13, a distal end portion of the small diameter shaft portion 16 is crimped so as to form a crimped portion 17, whereby the inner ring 21 is fixed in place between the rising surface and the crimped portion 17.

In addition, the pluralities of balls 41, 42 and the cages 45, 46 which hold the pluralities of balls 41, 42, respectively, are assembled between both the raceway surfaces 31, 32 of the outer ring 30 and both raceway surfaces 22, 23 of the hub shaft 13 side.

In addition, a fixing flange 35, which is adapted to be fixed to a vehicle body side member (a knuckle or a carrier) which is supported on a suspension system (not shown) of the vehicle with bolts, is formed on an outer circumferential surface of the outer ring 30.

As is shown in FIG. 1, a constant velocity joint which is referred to as a known Rzeppa joint or Birfield joint is used for the constant velocity joint 50, and the constant velocity joint 50 includes an inner ring 52 which is coupled integrally to one end of a drive shaft 151, an outer ring 60, a plurality of balls 53 which are installed between these inner and outer rings 52, 60 and a cage 54 for holding the plurality of balls 53.

The outer ring 60 of the constant velocity joint 50 includes a cap-shaped outer ring cylindrical portion 61 and an outer ring shaft portion 63 which is extended integrally from an end face 62 of an outer circumference of the outer ring cylindrical portion 61, and a male thread portion is formed at a distal end of the outer ring shaft portion 63.

In addition, after the outer ring shaft portion 63 is fittingly inserted into an inside hole in the hub shaft 13 of the wheel hub 10, a fastening nut 66 is fastened on to the male thread portion 65 at the distal end of the outer ring shaft portion 63, whereby the wheel hub 10 and the constant velocity joint 50 are connected together in such a manner that torque can be transmitted therebetween.

As is shown in FIG. 2, internal splines 14 are formed on an inner circumferential surface of the inside hole in the hub shaft 13 of the wheel hub 10, and external splines 64 are formed on an outer circumferential surface of the outer ring shaft portion 63 in such a manner as to mesh with the internal splines 14.

Figure 3:
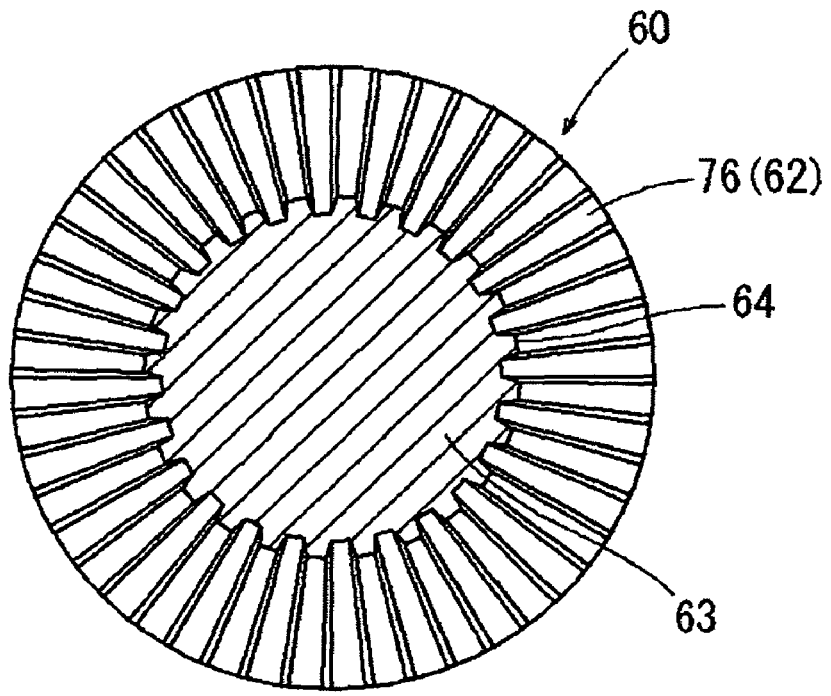
FIG. 3 is a cross-sectional view showing the outer ring shaft portion which is extended integrally from an end face of an outer ring of the constant velocity joint of Embodiment 1 of the invention.

In addition, side face splines 71 are formed on an end face (an end face of the crimped portion 17 in FIG. 2) of the hub shaft 13 of the wheel hub 10, and side face splines 76 are formed on an end face 62 of the outer ring 60 of the constant velocity joint 50 in such a manner as to mesh with the side face splines 71 (refer to FIG. 3). In addition, the wheel hub 10 and the constant velocity joint 50 are connected together through mutual meshing between the internal and external splines 14, 64 and between the side face splines 71, 76 in such a manner that torque can be transmitted therebetween.

The wheel supporting system according to Embodiment 1 is configured as has been described above.

Consequently, while the vehicle is running, the torque of the drive shaft 51 is transmitted sequentially to the inner ring 52, the plurality of balls 53 and the outer ring 60 in that order, whereby the outer ring 60 of the constant velocity joint which rotates in the same direction as the drive shaft 51 is caused to rotate.

The torque transmitted to the constant velocity joint 50 is transmitted to the wheel hub 10 through meshing of the internal and external splines 14, 64 which reside on the inner circumferential surface of the inside hole in the hub shaft 13 of the wheel hub 10 and on the outer ring shaft portion 63 of the constant velocity joint 50, and the same torque is also transmitted to the wheel hub 10 through meshing of the side face splines 71, 76 on the end face of the hub shaft 13 and the end face 62 of the outer ring 60 of the constant velocity joint 50, whereby the wheel is driven to rotate.

As has been described before, the torque on the constant velocity 50 side can be transmitted well to the wheel hub 10 side through the respective meshing between the internal and external splines 14, 64, as well as between the side face splines 71, 76.

Because of this, being from the related art, a relative slippage between the end face 62 of the outer ring 60 of the constant velocity joint 50 and the end face (the end face of the crimped portion 17) of the hub shaft 13 of the wheel hub 10 can be suppressed well. Hence, the generation of abnormal noise can be prevented which is caused by the relative slippage between the end face 62 of the outer ring 60 of the constant velocity joint 50 and the end face of the hub shaft 13 of the wheel hub 10.

Note that the invention is not limited to Embodiment 1 that has been described heretofore.

Figure 4:
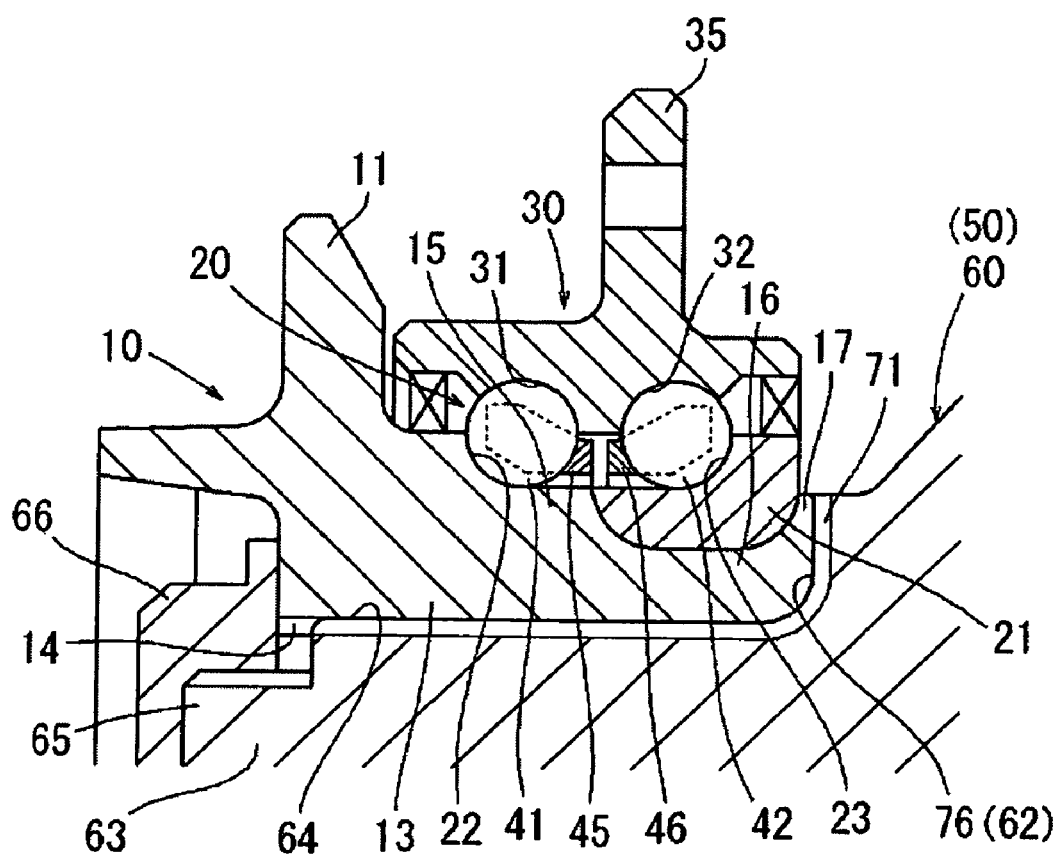
FIG. 4 is a sectional view showing an embodiment in which internal and external splines and side face splines are formed continuously on a hub shaft of a wheel hub and an outer ring shaft portion of a constant velocity joint.

For example, in Embodiment 1, while the internal splines 14 of the hub shaft 13 of the wheel hub 10 and the side face splines 71 are illustrated as being formed discontinuously in a spaced-away state, and the external splines 64 of the outer ring shaft portion 63 of the constant velocity joint 50 and the side face splines 76 on the end face 62 of the outer ring 60 are illustrated as being formed discontinuously in a spaced-away state, the invention can be implemented even in the event that, as is shown in FIG. 4, the internal splines 114 and the side face splines 71 are formed continuously from the inner circumferential surface of the hub shaft 13 to the end face of the crimped portion 17 of the wheel hub 10 and in association with this, the external splines 64 and the side face splines 76 are formed continuously from the outer circumferential surface of the outer ring shaft portion 63 to the end face 62 of the constant velocity joint 50.

As this occurs, a superior torque transmissivity is provided by such an extent that the meshing lengths between the internal and external splines and between the side face splines are increased, and the generation of abnormal noise which is caused by the relative slippage between the end face 62 of the outer ring 60 of the constant velocity joint 50 and the end face of the hub shaft 13 of the wheel hub 10 is prevented to great effect.

In addition, a configuration may be adopted in which only the internal splines 14 and the side face splines 71 on the wheel hub 10 are formed continuously, while the external splines 64 and the side face splines 76 of the constant velocity joint 50 are formed discontinuously as in Embodiment 1. Further, a configuration may be adopted in which only the external splines 64 and the side face splines 76 of the constant velocity joint 50 are formed continuously, while the internal splines 14 and the side face splines 71 on the wheel hub 10 are formed discontinuously as in Embodiment 1.

Additionally, in Embodiment 1, while the wheel hub 10 and the constant velocity joint 50 are illustrated as being fixedly coupled to each other by the fastening nut 66 being fastened on to the male thread portion 65 at the distal end of the outer ring shaft portion 63 of the constant velocity joint 50, a construction may be adopted in which female threads are formed at the distal end of the outer ring shaft portion 63 and a fastening bolt is screwed into the female threads so as to fixedly couple the wheel hub 10 and the constant velocity joint 50 together.

Embodiment 2

Embodiment 2 of the invention will be described in accordance with FIGS. 5 to 8.

Figure 5:
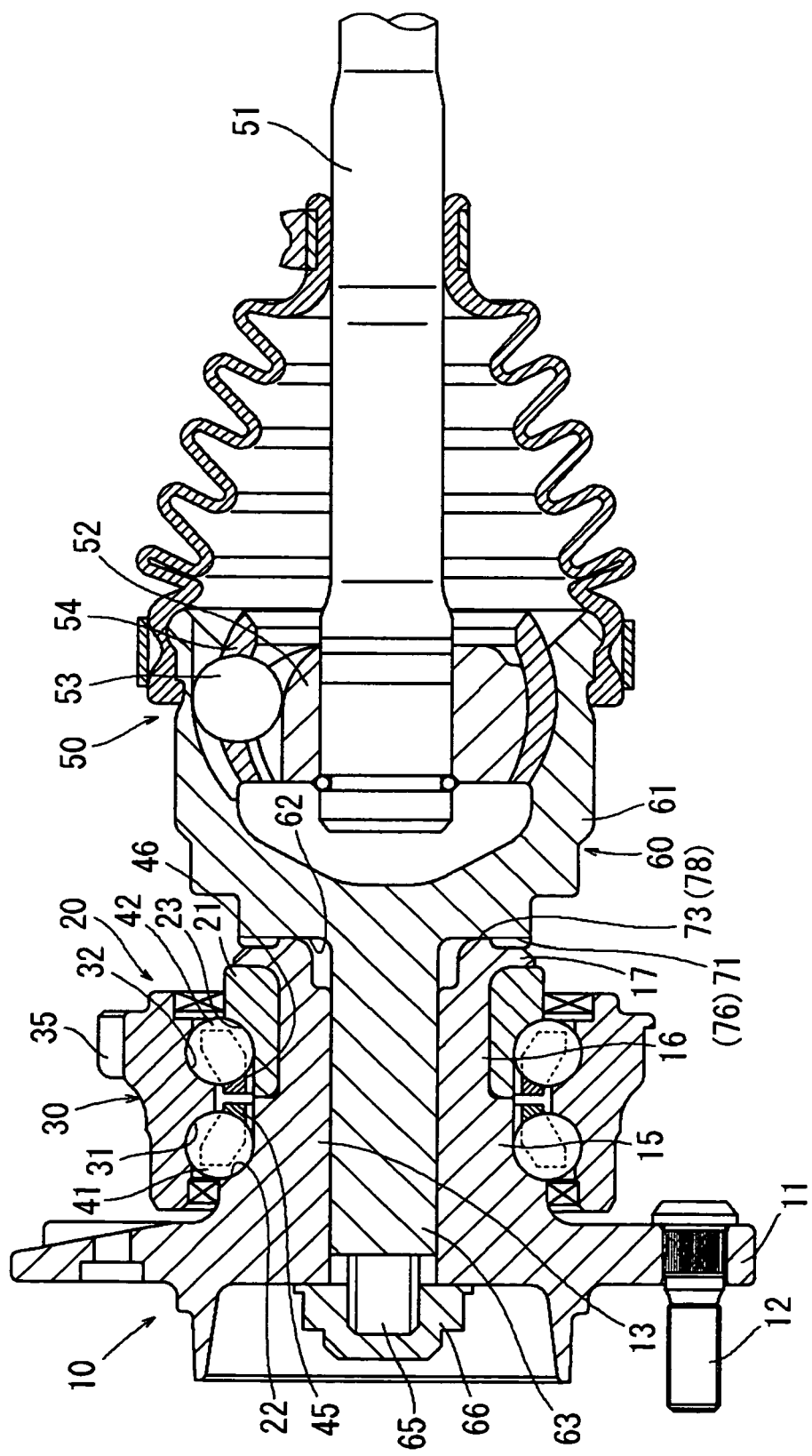
FIG. 5 is a side sectional view showing a wheel supporting system according to Embodiment 2 of the invention.
Figure 6:
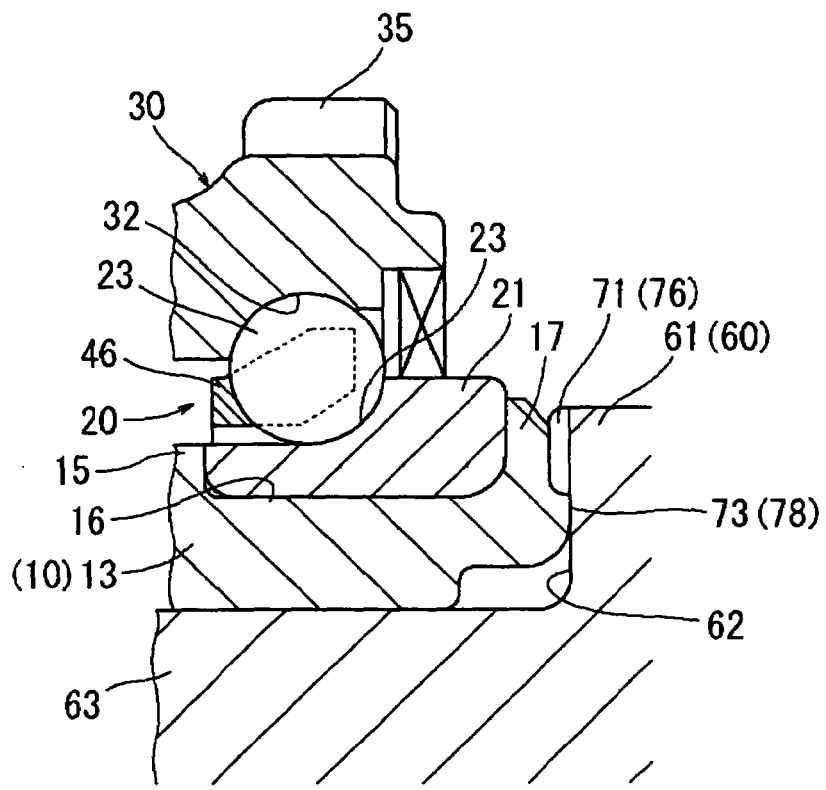
FIG. 6 is a sectional view showing an abutment portion between an end face of a hub shaft of a wheel hub and an end face of an outer ring of a constant velocity joint of Embodiment 1 of the invention.
Figure 7:
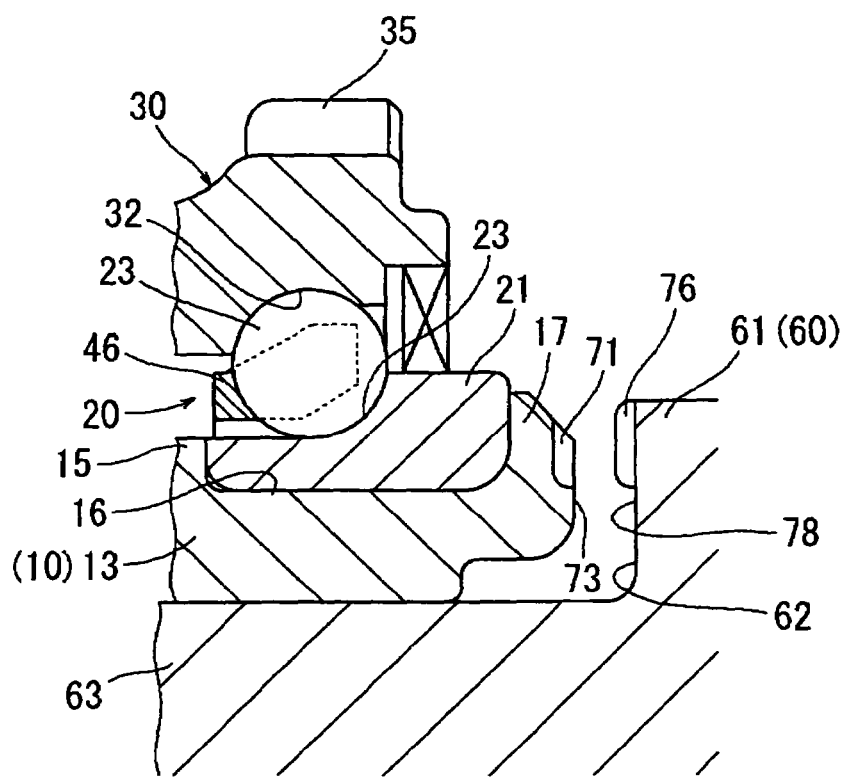
FIG. 7 is a sectional view showing a state in which the end face of the hub shaft of the wheel hub and the end face of the outer ring of the constant velocity joint of Embodiment 1 of the invention are spaced away from each other.
Figure 8:
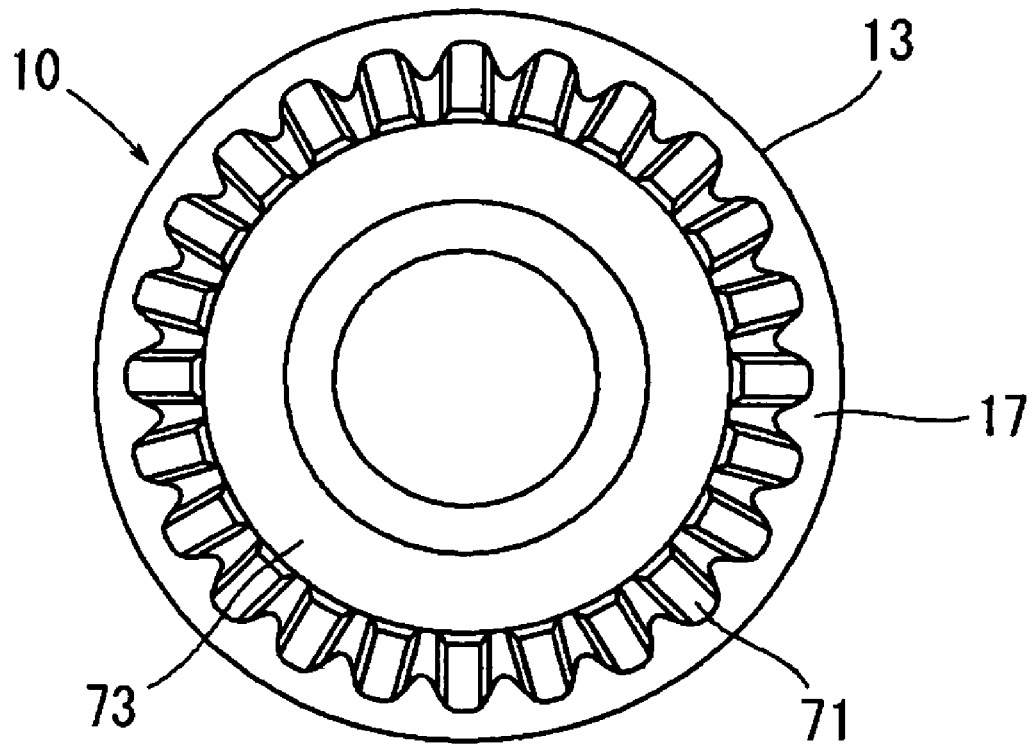
FIG. 8 is a front view showing the end face of the hub shaft of the wheel hub of Embodiment 1 of the invention.

FIG. 5 is a side sectional view showing a wheel supporting system according to Embodiment 2 of the invention. FIG. 6 is a sectional view showing an abutment portion between an end face of a hub shaft of a wheel hub and an end face of an outer ring of a constant velocity joint. FIG. 7 is a sectional view showing a state in which the end face of the hub shaft of the wheel hub and the end face of the outer ring of the constant velocity joint are spaced away from each other. FIG. 8 is a front view showing the end face of the hub shaft of the wheel hub.

In Embodiment 2 of the invention, like reference numerals will be given to like configurations to those of Embodiment 1, and the repeated description of those like configurations will be omitted.

As is shown in FIGS. 6 to 8, radially outer side annular portions and radially inner side annular portions are formed individually on both an end face (an end face of a crimped portion 17) of a hub shaft 13 and an end face 62 of an outer ring (an outer ring cylindrical portion 61) 60 of a constant velocity joint 50 which is brought into abutment with the end face of the hub shaft 13. In addition, side face splines 71, 76 are formed individually on both the radially outer side annular portions in such a manner as to mesh with each other so as to couple together a wheel hub 10 and the constant velocity joint 50 in such a manner that torque can be transmitted therebetween. In addition, flat surfaces 73, 78 are formed individually on both the radially inner side annular portions in such a manner as to be brought into close contact with each other so as to configure an annular seal portion.

The wheel supporting system of Embodiment 2 is configured as has been described above.

Consequently, while the vehicle is running, the torque of a drive shaft 51 is transmitted sequentially to an inner ring 52, a plurality of balls 53 and the outer ring 60 of the constant velocity joint 50 in that order, whereby the outer ring 60 is caused to rotate in the same direction as the drive shaft 51.

The torque transmitted to the constant velocity joint 50 is transmitted to the wheel hub 10 through meshing between the side face splines on both the radially inner side annular portions on the end face (the end face of the crimped portion 17) of the hub shaft 13 of the wheel hub 10 and the end face of the outer ring 60 of the constant velocity joint 50.

As has been described before, by the side face splines 71, 76 meshing with each other, the torque on the constant velocity joint 50 side can be transmitted to the wheel hub 10 side well. Because of this, being from the related art, the relative slippage between the end face of the hub shaft 13 of the wheel hub 10 and the end face 62 of the outer ring 60 of the constant velocity joint 50 can be suppressed well. Hence, the generation of abnormal noise which is caused by the relative slippage between the end face of the hub shaft 13 of the wheel hub 10 and the end face 62 of the outer ring 60 of the constant velocity joint can be prevented.

In addition, in Embodiment 2, since the annular seal portion is configured by the close contact between the flat surfaces 73, 78 of both the radially inner side annular portions on the end face of the hub shaft 13 of the wheel hub 10 and the end face 62 of the outer ring 60 of the constant velocity joint 50, muddy water or the like can be prevented from intruding further inwards than the annular seal portion by this annular seal portion.

For example, in the event that the end face of the hub shaft 13 and the end face 62 of the outer ring 60 of the constant velocity joint 50 are coupled together over the whole area of the abutment plane therebetween through the meshing of both the side face splines, muddy water or the like intrudes into the interior of the wheel supporting system from clearances in the meshing portion of these side face splines, resulting in a fear that rust is generated therein. However, a drawback like this can be prevented.

Additionally, in Embodiment 2 that has been described above, while the side face splines 71, 76 are illustrated as being formed individually on both the radially outer side annular portions and the flat surfaces 73, 78 which configure the annular seal portion are illustrated as being formed individually on both the radially inner side annular portions, a configuration may be adopted in which the flat surfaces 73, 78 which configure the annular seal portion are formed individually on both the radially outer side annular portions, while the side face splines 71, 76 are formed individually on both the radially inner side annular portions.

As this occurs, muddy water or the like can be prevented from reaching the clearances in the meshing portion of the side face splines 71, 76 of both the radially inner side annular portions. Because of this, the generation of rust can be prevented which would otherwise be caused by the intrusion of muddy water or the like.

In addition, in Embodiment 2, while the wheel hub 10 and the constant velocity joint 50 are illustrated as being fixedly coupled together by a fastening nut 66 being fastened on to a male thread portion 65 at a distal end of an outer ring shaft portion 63 of the constant velocity joint 50, a construction may be adopted in which female threads are formed at the distal end of the outer ring shaft portion 63, and a fastening bolt is screwed into the female threads so as to fixedly couple the wheel hub 10 and the constant velocity joint 50 together.

Embodiment 3

Next, Embodiment 3 of the invention will be described in accordance with FIGS. 9 to 11.

Figure 9:
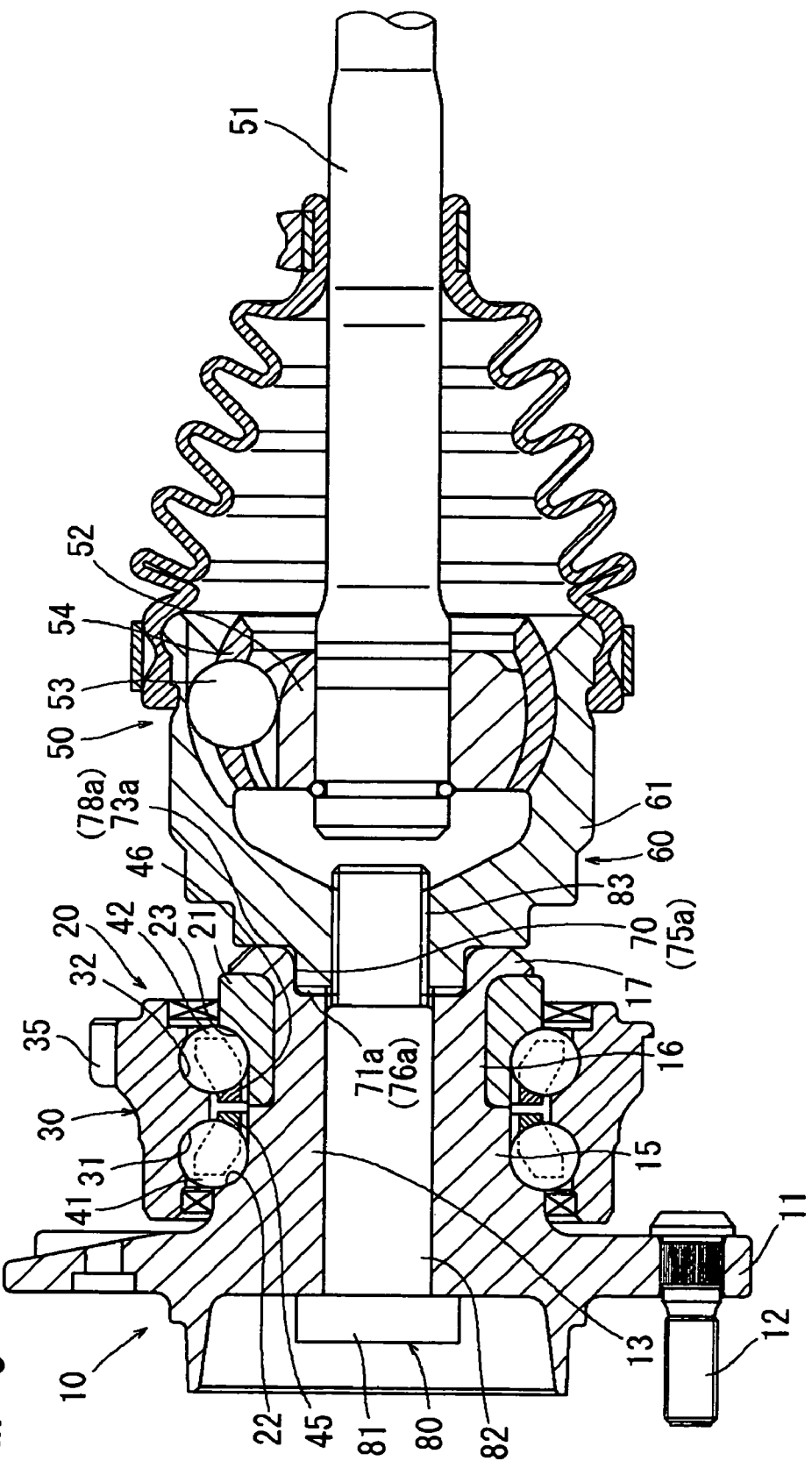
FIG. 9 is a side sectional view showing a wheel supporting system according to Embodiment 3 of the invention.

FIG. 9 is a side sectional view showing a wheel supporting system according to Embodiment 3 of the invention. FIG. 10 is a sectional view showing an abutment portion between an end face of a hub shaft of a wheel hub and an end face of an outer ring of a constant velocity joint. FIG. 11 is a sectional view showing a state in which the end face of the hub shaft of the wheel hub and the end face of the outer ring of the constant velocity joint.

Figure 10:
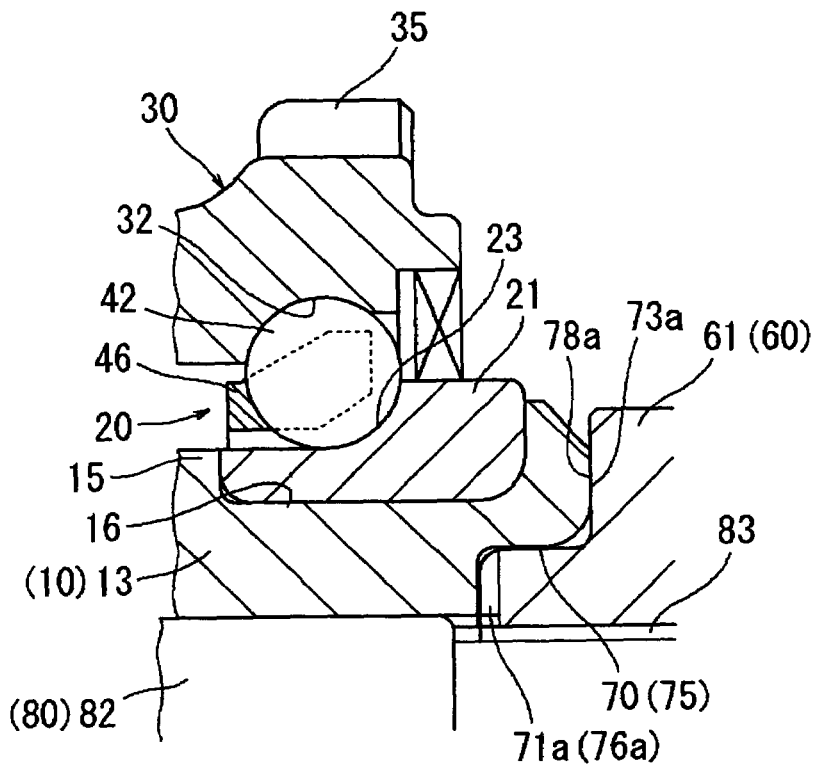
FIG. 10 is a sectional view showing an abutment portion between an end face of a hub shaft of a wheel hub and an end face of an outer ring of a constant velocity joint of Embodiment 2 of the invention.
Figure 11:
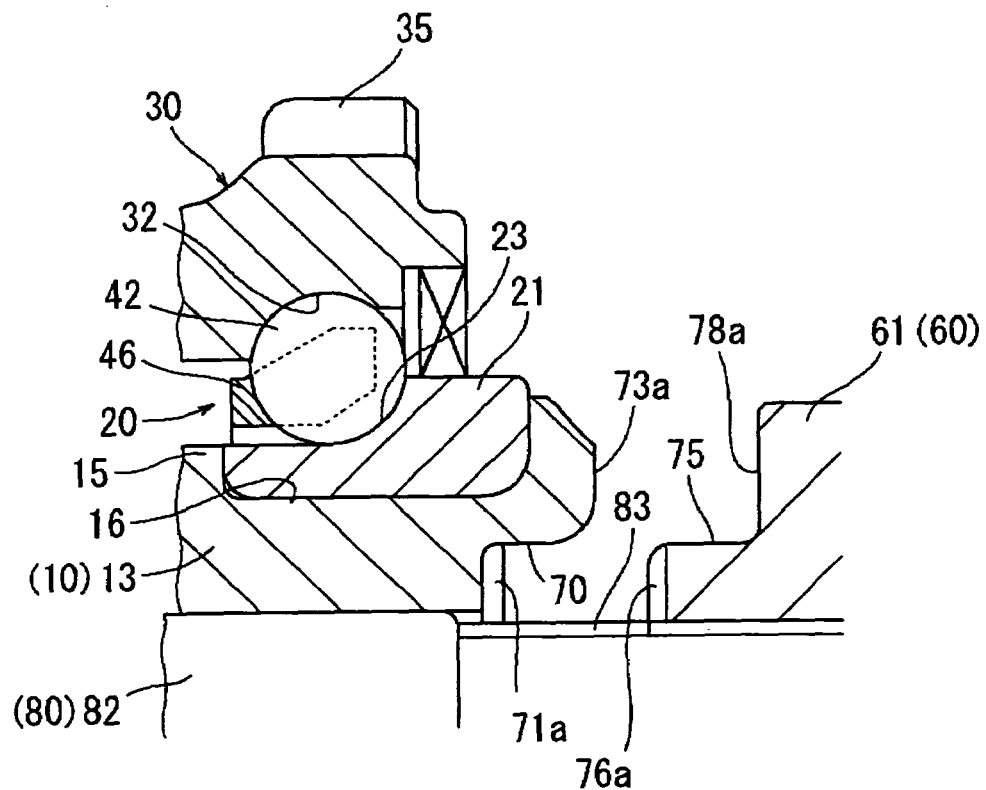
FIG. 11 is a sectional view showing a state in which the end face of the hub shaft of the wheel hub and the end face of the outer ring of the constant velocity joint of Embodiment 2 of the invention are spaced away from each other.

As is shown in FIGS. 9 to 11, in Embodiment 3, an end face of a hub shaft 13 of a wheel hub 10 and an end face of an outer ring 60 of a constant velocity joint 50 are brought into abutment with each other in a step-like fashion, and the wheel hub 10 and the outer ring 60 of the constant velocity joint 50 are connected together by a connecting shaft 80.

Namely, in Embodiment 3, a radially inner side annular portion on the end face of the hub shaft 13 is formed into a step-like configuration by being recessed further than a radially outer side annular portion thereof to an extent corresponding to a step portion 70. In addition, side face splines 71a are formed on the radially inner side annular portion at the end of the hub shaft 13, while a flat surface 73a is formed at the radially outer side annular portion.

On the other hand, a radially inner side annular portion on the end face of the outer ring 60 of the constant velocity joint 50 is formed into a step-like configuration by being caused to project further than a radially outer side annular portion thereof to an extent corresponding to a step portion 75. In addition, side face splines 76a are formed on the radially inner side annular portion on the end face of the outer ring 60 of the constant velocity joint 50 in such a manner as to mesh with the side face splines 71a for torque transmission, while a flat surface 78a is formed at the radially outer side annular portion in such a manner as to be brought into close contact with the flat surface 73a so as to configure an annular seal portion.

In addition, as is shown in FIG. 9, an inside hole is formed in a central portion of the hub shaft 13 into which the connecting shaft 80 having a head portion 81 and a shaft portion 82 is inserted at the shaft portion 82. In addition, female threads are formed in a central portion of the end face of the outer ring 60 of the constant velocity joint 50 in such a manner as to correspond to a male screw 83 formed at a distal end portion of the shaft portion 82 of the connecting shaft 80. Then, the shaft portion 82 of the connecting shaft 80 is fittingly inserted into the inside hole from one side towards the other side thereof, and the male screw 83 at the distal end portion of the shaft portion 82 is screwed in to the female threads in the outer ring 60 of the constant velocity joint 50, whereby the wheel hub 10 and the outer ring 60 of the constant velocity joint 50 are coupled together.

Since the other features of Embodiment 3 are made to be similar to those of Embodiment 2, like reference numerals will be given to like configurations, and the description thereof will be omitted.

Consequently, also in Embodiment 3, in a substantially similar way to that of Embodiment 2, the torque on the constant velocity joint 50 side can be transmitted to the wheel hub 10 side well through mutual meshing between the side face splines 71, 76, and the generation of abnormal noise can be prevented which would otherwise be caused by the relative slippage between the end face of the hub shaft 13 of the wheel hub 10 and the end face 62 of the outer ring 60 of the constant velocity joint 50.

In addition, in Embodiment 3, the annular seal portion is configured through the close contact of the flat surfaces 73a, 78a on both the radially outer side annular portions on the end face of the hub shaft 13 of the wheel hub 10 and the end face of the outer ring 60 of the constant velocity joint. Because of this, muddy water or the like can be prevented from reaching clearances defined as a result of the mutual meshing of the side face splines 71a, 76a, and the generation of rust can be prevented which would otherwise be caused by the intrusion of muddy water or the like.

Additionally, in Embodiment 3, while the side face splines 71a, 76a are illustrated as being formed individually on both the radially inner side annular portions and the flat surfaces 73a, 78a are illustrated as being formed individually on both the radially outer side annular portions in such a manner as to configure the annular seal portion, a configuration may be adopted in which the side face splines 71a, 76a are formed individually on both the radially outer side annular portions and the flat surfaces 73a, 78a are formed individually on both the radially inner side annular portions.

Embodiment 4

Embodiment 4 of the invention will be described in accordance with FIGS. 12 to 15.

Figure 12:
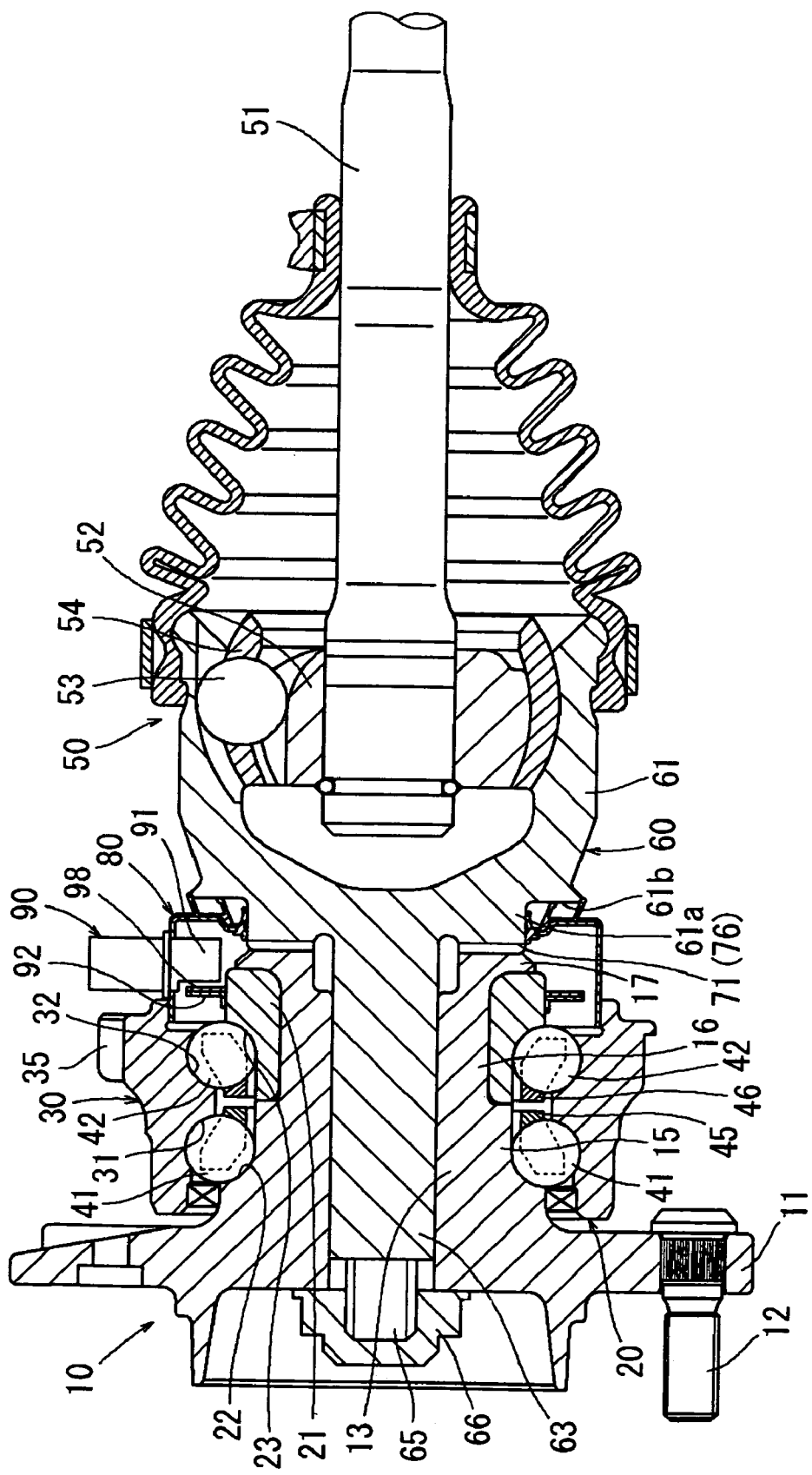
FIG. 12 is a side sectional view showing a wheel supporting system according to Embodiment 4 of the invention.
Figure 13:
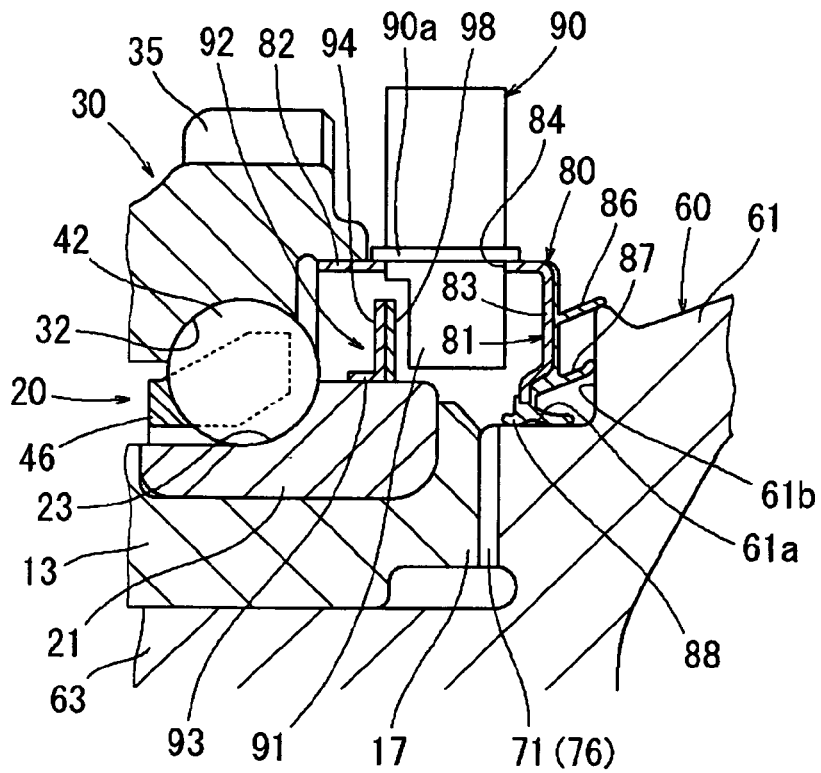
FIG. 13 is a sectional view showing in an enlarged fashion a state in which a cover member is mounted between an outer ring of an angular ball bearing of a hub shaft and an outer ring of a constant velocity joint of Embodiment 4 of the invention.
Figure 14:
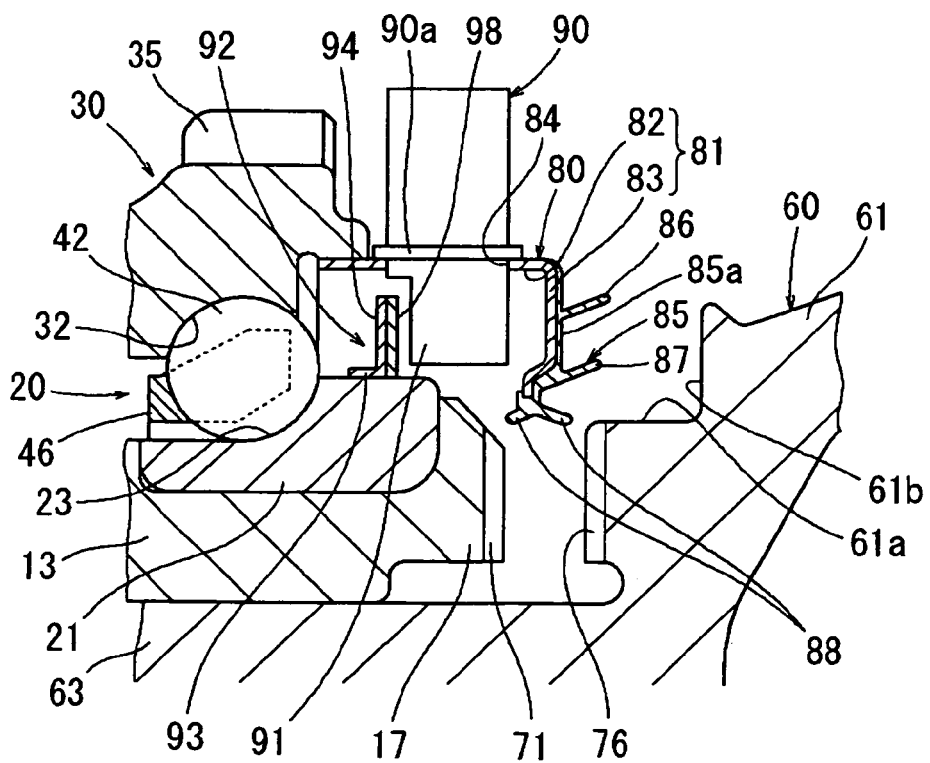
FIG. 14 is a sectional view showing a state in which an end face of the hub shaft and an end face of the constant velocity joint of Embodiment 4 of the invention are spaced away from each other.
Figure 15:
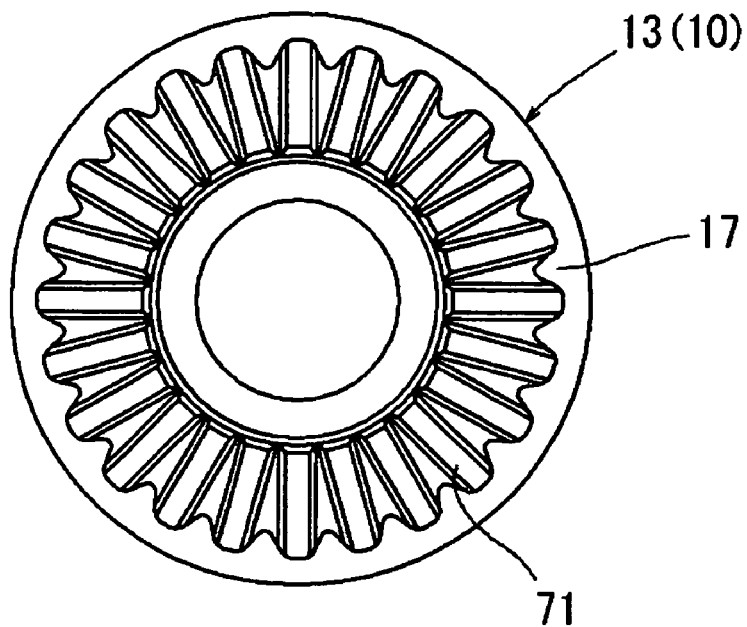
FIG. 15 is a front view showing the end face of the hub shaft of a wheel hub of Embodiment 4 of the invention.

FIG. 12 is a side sectional view showing a wheel supporting system according to Embodiment 4 of the invention. FIG. 13 is a sectional view showing in an enlarged fashion a state in which a cover member is mounted between an outer ring of an angular ball bearing of a hub shaft and an outer ring of a constant velocity joint. FIG. 14 is a sectional view showing a state in which an end face of the hub shaft and an end face of the constant velocity joint are spaced away from each other. FIG. 15 is a front view showing the end face of the hub shaft.

In Embodiment 4 of the invention, like reference numerals will given to like configurations to those of Embodiment 1, and the repeated description thereof will be omitted.

As is shown in FIG. 12, a constant velocity joint which is referred to as a Rzeppa joint or Birfield joint is used for a constant velocity joint 50, and the constant velocity joint 50 includes an inner ring 52 which is coupled integrally to one end of a drive shaft 51, an outer ring 60, a plurality of balls 53 which are installed between these inner and outer rings 52, 60 and a cage 54 for holding the plurality of balls 53.

The outer ring 60 of the constant velocity joint 50 includes a cap-shaped outer ring cylindrical portion 61, a circular cylindrical projecting portion 61a which is caused to project from one end side of the outer ring cylindrical portion 61 via a rising face 61b interposed therebetween and an outer ring shaft portion 63 which is caused to project integrally from a central portion of a distal end face of the projecting portion 61a, a male thread portion 65 being formed at a distal end of the outer ring shaft portion 63.

In addition, as is shown in FIGS. 13 to 15, side face splines 71, 76, which are adapted to mesh with each other, are formed individually on both an end face (an end face of a crimped portion 17) of a hub shaft 13 and an end face (the distal end face) of the projecting portion 61a of the outer ring (the outer ring cylindrical portion 61) of the constant velocity joint 50 which is brought into abutment with the end face of the hub shaft 13. In addition, after the outer ring shaft portion 63 of the constant velocity joint 50 is fittingly inserted into an inside hole in the hub shaft 13 of a wheel hub 10, by a fastening nut 66 being fastened on to the male thread portion 65 at the distal end of the outer ring shaft portion 63, both the side face splines 71, 76 on the end face of the hub shaft 13 of the wheel hub 10 and the end face of the projecting portion 61a of the outer ring 60 of the constant velocity joint 50 are caused to mesh with each other, whereby the wheel hub 10 and the constant velocity joint 50 are made to be coupled together in such a manner that torque can be transmitted therebetween (refer to FIG. 12).

As is shown in FIGS. 13 and 14, a cover member 80 is mounted between an end portion of an outer ring 30 of an angular ball bearing 20 which is provided on an outer circumference of the hub shaft 13 and an end portion of the outer ring 60 of the constant velocity joint 50 in such a manner as to cover the meshing portion between the side face splines 71, 76 and a clearance between both the outer rings 30, 60 so as to seal the relevant portions.

The cover member 80 includes integrally a metallic core metal 81 and an elastic seal material 85 which is made from an elastomer material such as a soft resin, a rubber or the like.

The core metal 81 is formed by pressing sheet metal such as a low carbon steel sheet and has a cylindrical portion 82 which is press fitted in an inner circumferential surface of an opening at one end portion of the outer ring 30 of the angular ball bearing 20 on the hub shaft 13 and an annular portion 83 which is caused to project from an end portion (an end portion opposite to the press fitted side) of the cylindrical portion 82 towards an outer circumferential surface of the projecting portion 61a of the outer ring 60 of the constant velocity joint 50.

As is shown in FIGS. 13 and 14, the elastic seal material 85 includes a thin elastic layer 85a which is joined integrally to an outer surface of an annular portion 83 of the core metal 81 in such a manner as to cover the outer surface, an outer lip 86 which is extended from a portion which lies closer to an outer circumferential side of the elastic layer 85a, an intermediate lip 87 which is extended from an intermediate portion of the elastic layer 85a, and a far side lip 88 which is extended from an inside diameter end portion of the elastic layer 85a.

In addition, as is shown in FIG. 13, a distal end portion of the outer lip 86 is made to be brought into elastic close contact with an outer circumferential edge of the rising surface 61b of the outer ring 60, the intermediate lip 87 is made to be brought into elastic close contact with an intermediate position of the rising surface 61b, and the far side lip 88 is made to be divided in a bifurcating fashion so as to be brought into elastic close contact with an outer circumferential surface of the projecting portion 61a of the outer ring 60.

Additionally, as is shown in FIG. 13, a pulser ring 98 is mounted in an interior of the cover member 80 by a mounting member 92 in such a manner as to face a detecting portion 91 of a vehicle speed detector 90, which will be described below.

The mounting member 92 has a cylindrical portion 93 which is fixedly press fitted on an outer circumferential surface of an inner ring of the wheel hub 10 and a flange portion 94 which is bent radially outwards in an orthogonal fashion from one end of the cylindrical portion 93 and has a substantially L-shaped section. In addition, the pulser ring 98, which is made up of a magnetized ring or the like, is provided on a lateral surface of the flange portion 94 of the mounting member 92. Note that a configuration may be adopted in which a large number of recessed portions and a large number of raised portions are formed alternately in a circumferential direction on the lateral surface of the flange portion 94 so as to configure a pulser ring.

On the other hand, an insertion hole 84 which corresponds to the detecting portion 91 of the vehicle speed detector 90 and a plurality of mounting holes (not shown) for mounting the vehicle speed detector 90 at a mounting piece 90a which is provided on an outer circumferential surface thereof in such a manner as to project therefrom are formed on the cylindrical portion 82 of the core metal 81 of the cover member 80.

In addition, the vehicle speed detector 90 is mounted by the detecting portion 91 thereof being inserted into the insertion hole 84 in the cylindrical portion 82 and mounting screw being screwed into the mounting holes in the cylindrical portion 82 through the mounting piece 90a. Then, in this mounted state, the detecting portion 91 of the vehicle speed detector 90 is set to lie close to a detected portion on an outer circumferential surface of the pulser ring 98 for detection.

The wheel supporting system of Embodiment 4 is configured as has been described above.

Consequently, while the vehicle is running, the torque of a drive shaft 51 is transmitted sequentially to the inner ring 52, the plurality of balls 53 of the constant velocity joint 50 and the outer ring 60 of the constant velocity joint 50 in that order, whereby the outer ring 60 of the constant velocity joint is caused to rotate in the same direction as the drive shaft 51.

The torque transmitted to the outer ring 60 of the constant velocity joint 50 is transmitted to the wheel hub 10 through meshing between the side face splines on the end face (the end face of the crimped portion 17) of the hub shaft 13 of the wheel hub 10 and the end face of the outer ring 60 of the constant velocity joint 50, whereby the wheel is driven to rotate.

As has been described before, the torque on the constant velocity 50 side can be transmitted to the wheel hub 10 side well through the mutual meshing of the side face splines 71, 76. Because of this, being from the related art, the relative slippage between the end face of the hub shaft 13 of the wheel hub 10 and the end face of the outer ring 60 of the constant velocity joint 50 can be suppressed well. Hence, the generation of abnormal noise can be prevented which would otherwise be caused by the relative slippage between the end face of the hub shaft 13 of the wheel hub 10 and the end face of the outer ring 60 of the constant velocity joint 50.

In addition, the meshing portion between both the side face splines 71, 76 and the clearance between both the outer rings 30, 60 can be covered to be sealed by the cover member 80 which is mounted between the outer ring 30 of the angular ball bearing 20 on the outer circumference of the hub shaft 13 and the outer ring 50 of the constant velocity joint 50. Because of this, muddy water or the like which is splashed by the wheels while the vehicle is running can be prevented from intruding into the interior of the angular ball bearing 20 on the outer circumference of the hub shaft 13 and into the clearances defined as a result of meshing of both the side face splines 71, 76.

In addition, since the cylindrical portion 82 of the core metal 81 of the cover member 80 is press fitted in the inner circumferential surface of the end portion of the outer ring 30 of the angular ball bearing 20 on the outer circumference of the hub shaft 13, the intrusion of muddy water or the like from the relevant portion can be prevented well.

Additionally, the respective distal end portions of the outer lip 86, the intermediate lip 87 and the far side lip 88 which are joined integrally to the annular portion 83 of the core metal 81 so as to configure the elastic seal material 85 are brought into elastic close contact with the respective portions on the outer circumferential surface of the outer ring 60 of the constant velocity joint 50, whereby the intrusion of muddy water or the like can be prevented well.

In addition, by the pulser ring 98 for the vehicle speed detector 90 being installed in the interior of the cover member 80, the pulser ring 98 can be protected from muddy water, dust or the like.

In addition, in Embodiment 4, the vehicle speed detector 90 is mounted by the detecting portion 91 being inserted into the insertion hole 84 in the cylindrical portion 82 and the mounting screws (not shown) being screwed into the mounting holes in the cylindrical portion 82 through the mounting piece 90a at a timing when the mounting piece 90a is brought into abutment with the outer circumferential surface of the cylindrical portion 82 of the cover member (the core metal 81) 80. Additionally, in this mounted state, the detecting portion 91 approaches the detected portion of the pulser ring 98 for detection. Because of this, the cover member 80 can double as the mounting member of the vehicle speed detector 90, and the alignment of the detecting portion 91 of the vehicle speed detector 90 with the detected portion on the outer circumferential surface of the pulser ring 98 can be implemented easily and accurately.

Note that in Embodiment 4, while the wheel hub 10 and the constant velocity joint 50 are illustrated as being fixedly coupled together by the fastening nut 66 being fastened on to the male thread portion 65 at the distal end of the outer ring shaft portion 63 of the constant velocity joint 50 as is shown in FIG. 12, a construction may be adopted in which female threads are formed at the distal end of the outer ring shaft portion 63, and a fastening bolt is screwed into the female threads so as to fixedly couple the wheel hub 10 and the constant velocity joint 50 together.

Fifth Embodiment

Next, Embodiment 5 of the invention will be described based on FIG. 16.

Figure 16:
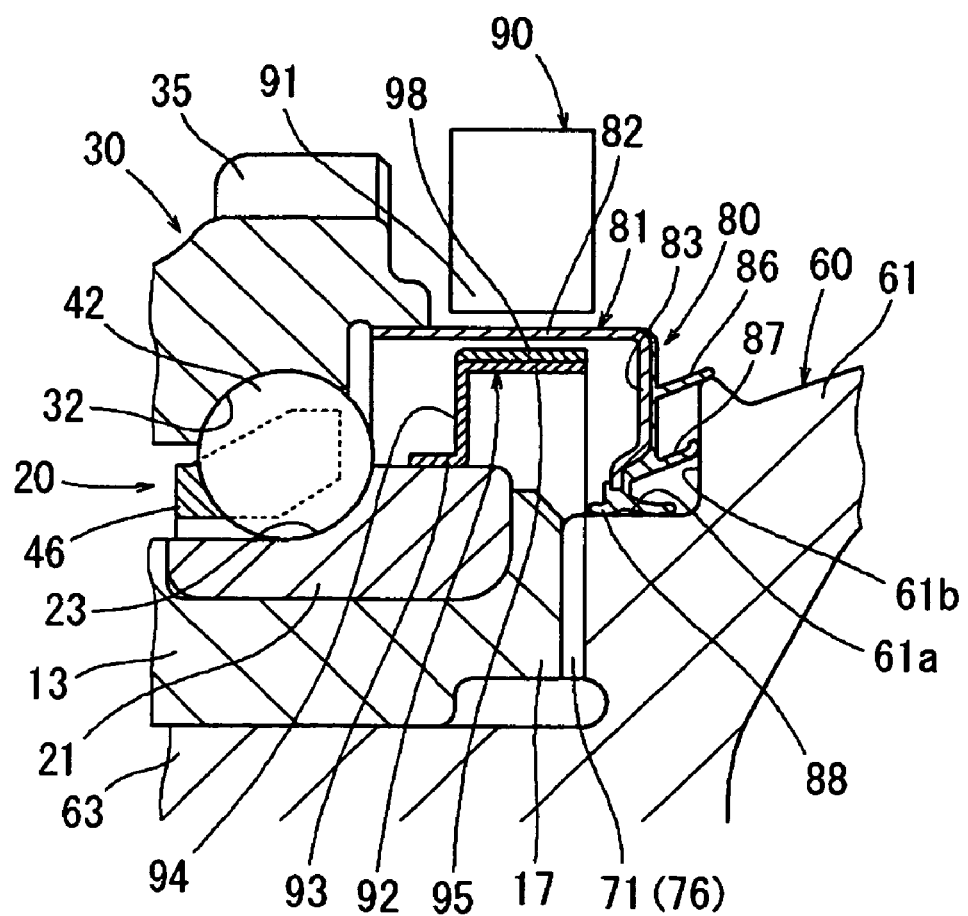
FIG. 16 is a sectional view showing in an enlarged fashion a state in which a cover member is mounted between an outer ring of an angular ball bearing of a hub shaft and an outer ring of a constant velocity joint of a wheel supporting system according to Embodiment 5 of the invention.

FIG. 16 is a sectional view showing in an enlarged fashion a state in which a cover member is mounted between an outer ring of an angular ball bearing of a hub shaft and an outer ring of a constant velocity joint of a wheel supporting system according to Embodiment 5 of the invention.

As is shown in FIG. 16, a core metal 81 of a cover member 80 is formed of a non-magnetic material such as non-magnetic sheet metal (for example, aluminum alloy, sheet copper or the like), a synthetic resin or the like.

In addition, a detecting portion 91 of a vehicle speed detector 90 is installed in such a manner as to lie close to an outer circumferential surface of a cylindrical portion 82 of the core metal 81. Note that the vehicle speed detector 90 may be mounted on a vehicle side member (a knuckle or a carrier) or mounted on the cover member 80.

On the other hand, a mounting member 92 for mounting a pulser ring 98 in an interior of the cover member 80 has a cylindrical portion 93 which is fixedly press fitted on an outer circumferential surface of an inner ring 21 of a wheel hub 10, a flange portion which is bent radially outwards in an orthogonal fashion from one end of the cylindrical portion 93 and an outer cylindrical portion 95 which is formed in such a manner as to extend along an inner circumferential surface of the cylindrical portion 82 of the core metal 81 from an outer circumferential edge of the flange portion 94 and is formed into a stepped circular cylindrical shape. A pulser ring 98, which is made up of a magnetized ring, is affixed on to an outer circumferential surface of the outer cylindrical portion 95 of the mounting member 92. In this mounted state, the pulser ring 98 is made to lie close to a position which corresponds to the detecting portion 91 of the vehicle speed detector 90 and the inner circumferential surface of the cylindrical portion 82 of the core metal 81.

Since the other configurations of Embodiment 5 are made similar to those of Embodiment 4, like reference numerals will be given to like constituent portions, and the description thereof will be omitted.

Consequently, also in Embodiment 5, the substantially similar functions and advantages to those of Embodiment 4 are provided.

However, in Embodiment 5, since there is no need to open an insertion hole and mounting holes for the detecting portion 91 of the vehicle speed detector 90 in the cylindrical portion 82 of the metal core 81 of the cover member 80, an increase in sealing properties can be realized.

Embodiment 6

Next, Embodiment 6 will be described in accordance with FIGS. 17 and 18.

Figure 17:
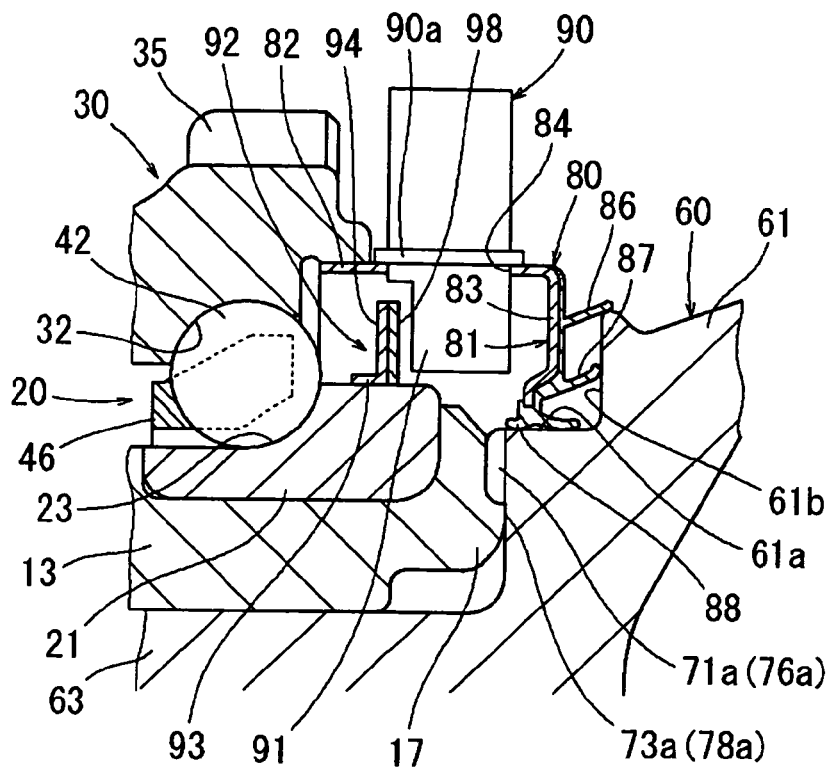
FIG. 17 is a sectional view showing a fitting portion of side face splines on an end face of a hub shaft and an end face of an outer ring of a constant velocity joint of a wheel supporting system according to Embodiment 6 of the invention.

FIG. 17 is a sectional view showing a fitting portion of side face splines on an end face of a hub shaft and an end face of an outer ring of a constant velocity joint of a wheel supporting system according to Embodiment 6 of the invention. FIG. 18 is a sectional view showing a state in which the side face splines on the end face of the hub shaft and the end face of the outer ring of the constant velocity joint are space away from each other.

Figure 18:
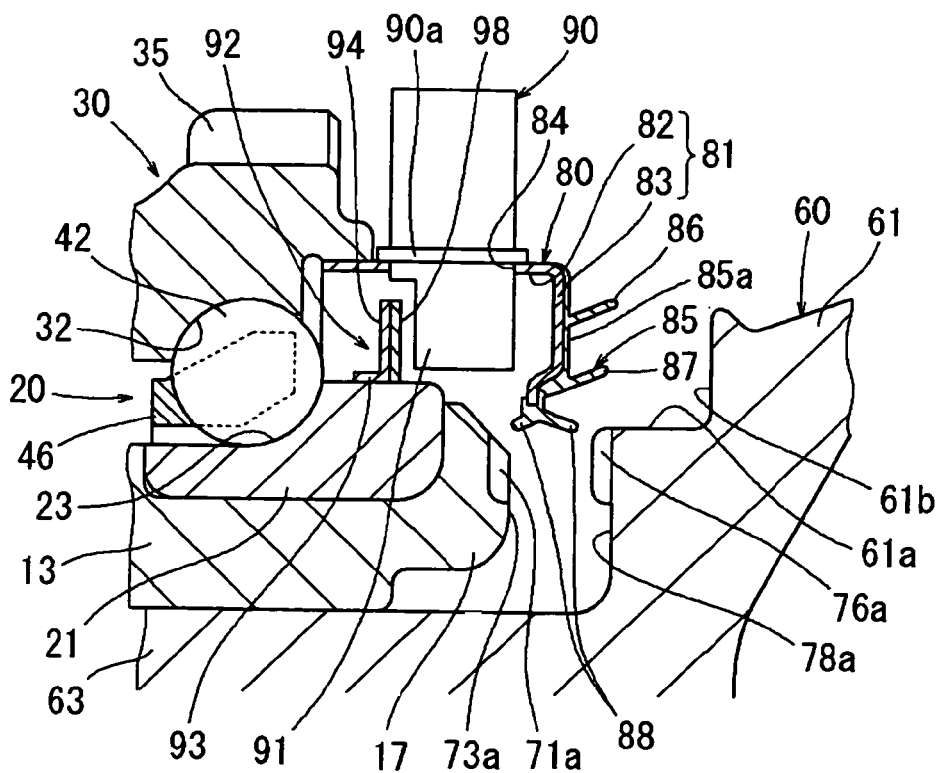
FIG. 18 is a sectional view showing a state in which the side face splines on the end face of the hub shaft and the end face of the outer ring of the constant velocity joint of Embodiment 6 of the invention are space away from each other.

As is shown in FIGS. 17 and 18, in Embodiment 6, radially outer side annular portions and radially inner side annular portions are formed individually on both an end face (an end face of a crimped portion 17) of a hub shaft 13 and an end face 62 of an outer ring (an outer ring cylindrical portion 61) of a constant velocity joint 50 which is brought into abutment with the end face of the hub shaft 13. In addition, side face splines 71a, 76a are formed individually on both the radially outer side annular portions in such a manner as to mesh with each other so as to couple a wheel hub 10 and the constant velocity joint 50 together in such a manner that torque can be transmitted therebetween. In addition, flat surfaces 73a, 78a are formed individually on both the radially inner side annular portions in such a manner as to be brought into close contact with each other so as to configure an annular seal portion.

In addition, a cover member 80, a vehicle speed detector 90, a pulser ring 98 and a mounting member 92 are similar to those of Embodiment 4 or Embodiment 5. In FIGS. 17 and 18, the cover member 80, the vehicle speed detector 90, the pulser ring 98 and the mounting member 92 that have been described in Embodiment 4 are shown.

Additionally, since the other configurations of Embodiment 6 are made similar to those of Embodiment 4 or Embodiment 5, like reference numerals will be given to like constituent portions, and the description thereof will be omitted.

Consequently, in Embodiment 6, too, substantially similar functions and advantages to those of Embodiment 4 are provided.

However, in Embodiment 6, even in case a failure in sealing by the cover member 80 occurs unexpectedly, resulting in the intrusion of muddy water or the like into the interior of the cover member 80, since the annular seal portion is configured by the close contact between the flat surfaces 73, 78 of both the radially inner side annular portions on the end face of the hub shaft 13 of the wheel hub 10 and the end face of the outer ring 60 of the constant velocity joint 50, the muddy water or the like can be prevented from intruding further inwards than the annular seal portion by the annular seal portion. By this, a drawback can be prevented of intrusion of muddy water or the like into the interior of the wheel supporting system from clearances defined as a result of meshing of the side face splines.

Additionally, in Embodiment 6 that has been described above, while the side face splines 71a, 76a are illustrated as being formed individually on both the radially outer side annular portions and the flat surfaces 73a, 78a, which configure the annular seal portion, are illustrated as being formed individually on both the radially inner side annular portions, a configuration may be adopted in which the flat surfaces 73a, 78a, which configure the annular seal portion, are illustrated as being formed individually on both the radially outer side annular portions, and the side face splines 71a, 76a are illustrated as being formed individually on both the radially inner side annular portions.

As this occurs, muddy water or the like can be prevented from reaching the clearances defined as a result of meshing of the side face splines 71, 76a.

Embodiment 7

Next, Embodiment 7 of the invention will be described in accordance with FIGS. 19 to 21.

Figure 19:
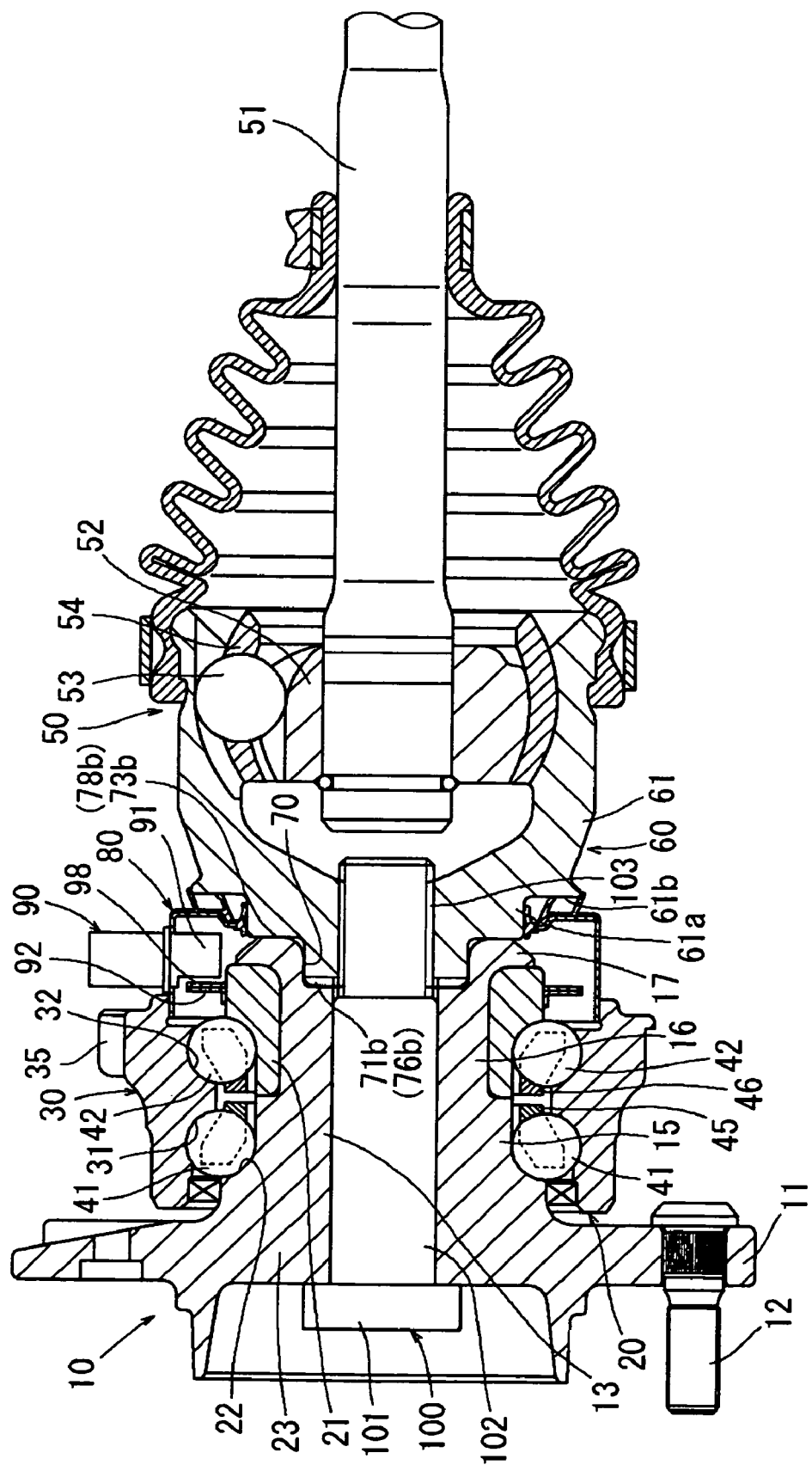
FIG. 19 is a side sectional view showing a wheel supporting system according to Embodiment 7 of the invention.

FIG. 19 is a side sectional view showing a wheel supporting system according to Embodiment 7 of the invention. FIG. 20 is a sectional view showing a fitting portion of side face splines on an end face of a hub shaft and an end face of an outer ring of a constant velocity joint. FIG. 21 is a sectional view showing a state in which the side face splines on the end face of the hub shaft and the end face of the outer ring of the constant velocity joint are spaced away from each other.

Figure 20:
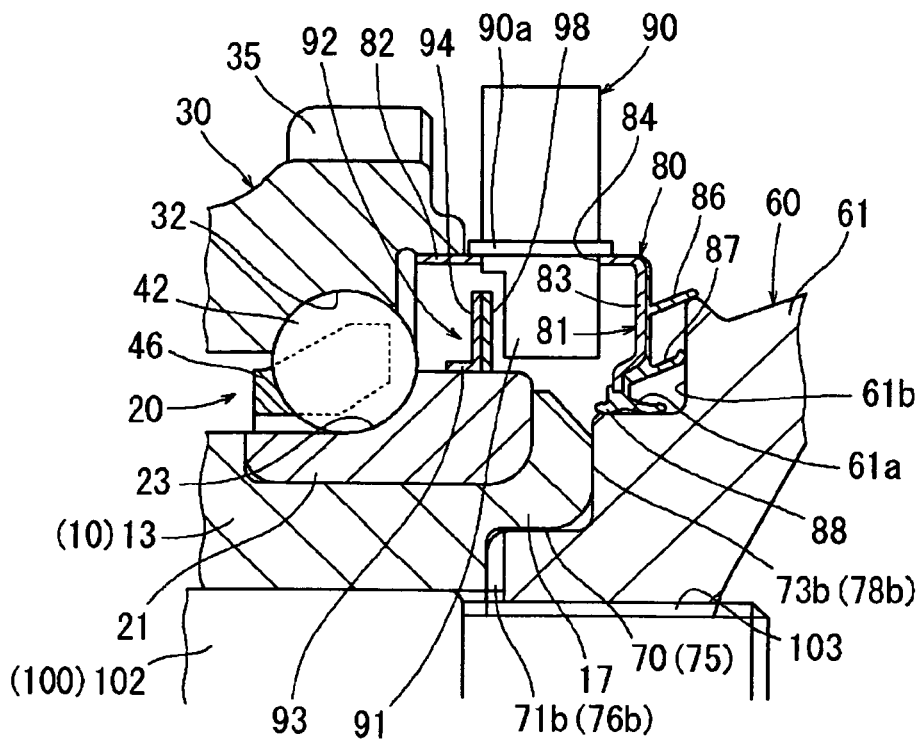
FIG. 20 is a sectional view showing a fitting portion of side face splines on an end face of a hub shaft and an end face of an outer ring of a constant velocity joint of Embodiment 7 of the invention.
Figure 21:
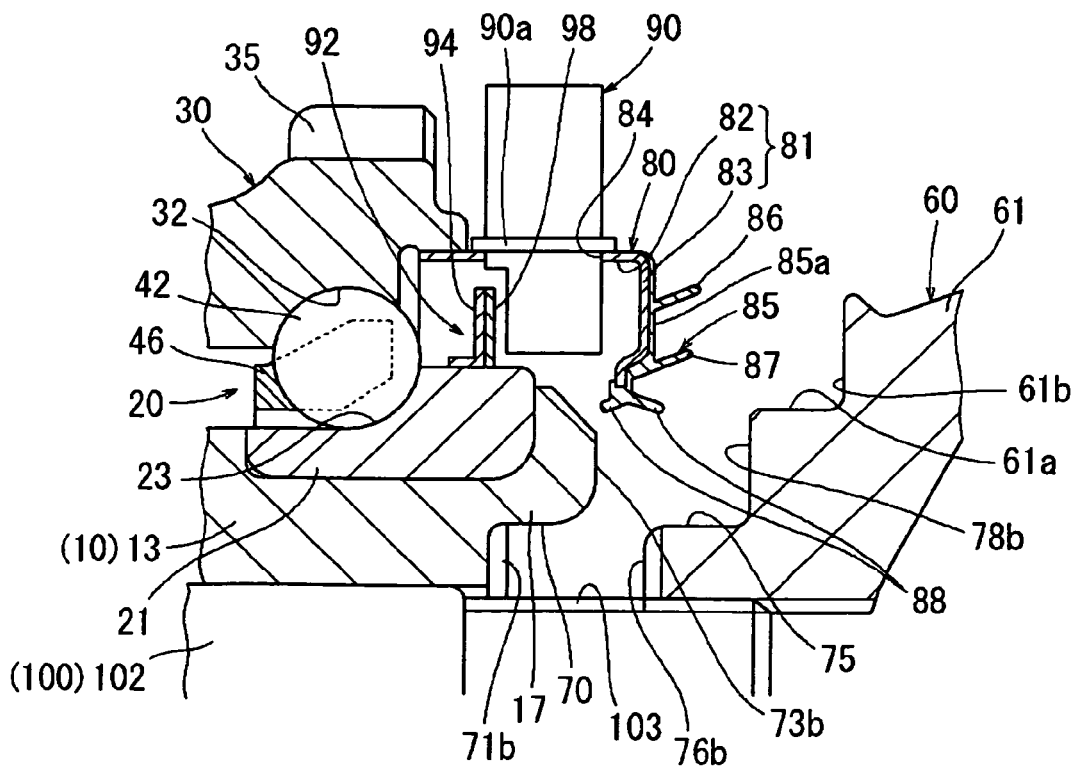
FIG. 21 is a sectional view showing a state in which the side face splines on the end face of the hub shaft and the end face of the outer ring of the constant velocity joint of Embodiment 7 of the invention are spaced away from each other.
Figure 22:
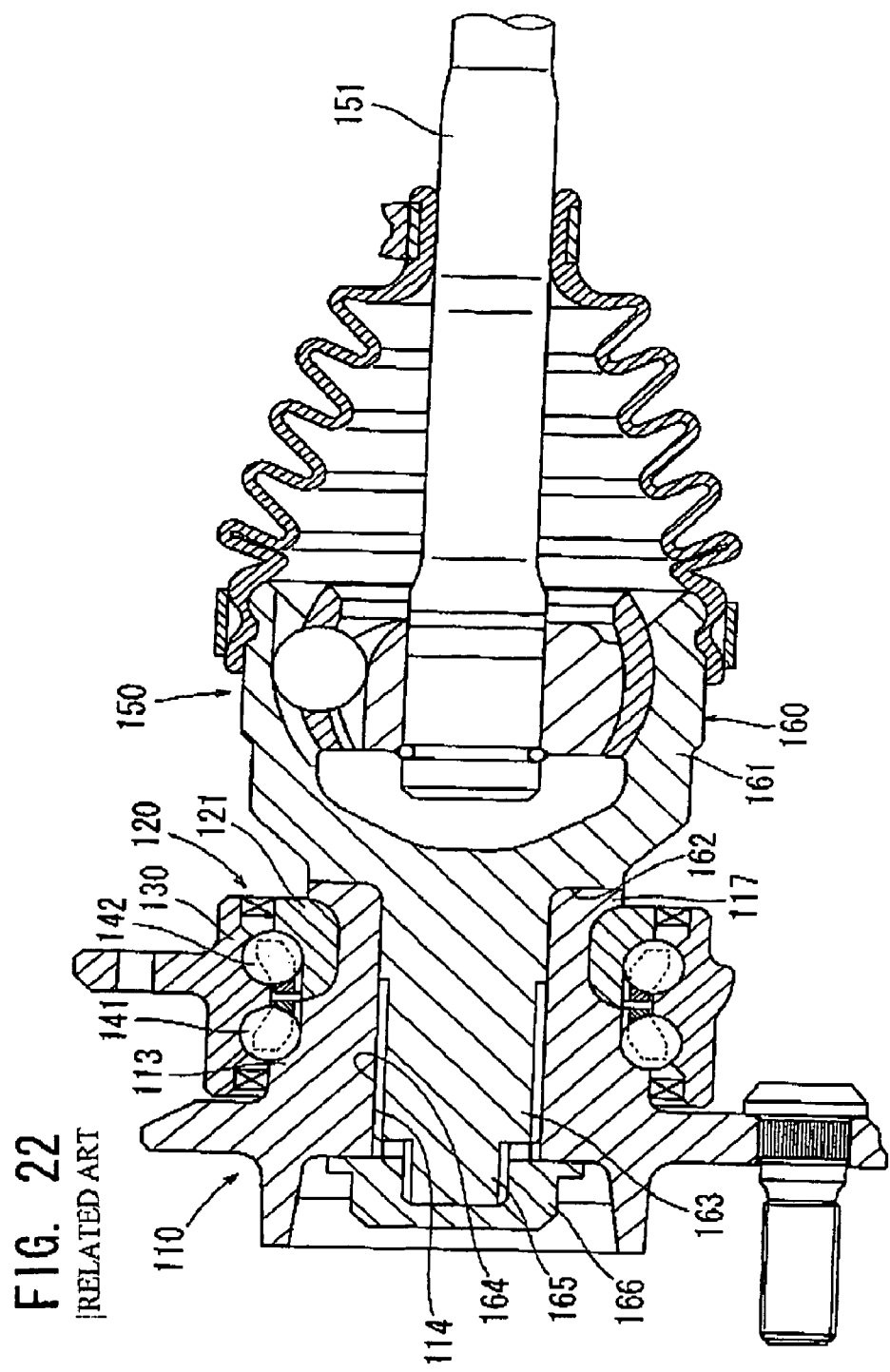
FIG. 22 is a side sectional view showing a state in which an outer ring shaft portion of a constant velocity is spline fitted in an inside hole in a hub shaft of a wheel hub in a conventional wheel supporting system.

As is shown in FIGS. 19 to 21, in Embodiment 7, an end face of a hub shaft 13 of a wheel hub 10 and an end face of an outer ring 60 of a constant velocity joint 50 are brought into abutment with each other in a step-like fashion, and the wheel hub 10 and the outer ring 60 of the constant velocity joint 50 are connected together by a connecting shaft 100.

Namely, in Embodiment 7, a radially inner side annular portion on the end face (the end face of a crimped portion 17) of the hub shaft 13 is formed into a step-like configuration by being recessed further than a radially outer side annular portion thereof to an extent corresponding to a step portion 70. In addition, side face splines 71b are formed on the radially inner side annular portion at the end of the hub shaft 13, while a flat surface 73b is formed at a radially outer side annular portion.

On the other hand, a radially inner side annular portion on the end face (the end face of a projecting portion 61a) of the outer ring 60 of the constant velocity joint 50 is formed into a step-like configuration by being caused to project further than a radially outer side annular portion thereof to an extent corresponding to a step portion 75. In addition, side face splines 76b are formed on the radially inner side annular portion on the end face of the outer ring 60 of the constant velocity joint 50 in such a manner as to mesh with the side face splines 71b for torque transmission, while a flat surface 78b is formed at the radially outer side annular portion in such a manner as to be brought into close contact with the flat surface 73b so as to configure an annular seal portion.

In addition, as is shown in FIG. 19, an inside hole is formed in a central portion of the hub shaft 13 into which the connecting shaft 100 having a head portion 101 and a shaft portion 102 is inserted at the shaft portion 102. In addition, female threads are formed in a central portion of the end face of the outer ring 60 of the constant velocity joint 50 in such a manner as to correspond to a male screw 103 formed at a distal end portion of the shaft portion 102 of the connecting shaft 100. Then, the shaft portion 102 of the connecting shaft 100 is fittingly inserted into the inside hole from one side towards the other side thereof, and the male screw 103 at the distal end portion of the shaft portion 102 is screwed in to the female threads in the outer ring 60 of the constant velocity joint 50, whereby the wheel hub 10 and the outer ring 60 of the constant velocity joint 50 are coupled together.

In addition, a cover member 80, a vehicle speed detector 90, a pulser ring 98 and a mounting member 92 are similar to those of Embodiment 4 or Embodiment 5. In FIGS. 19 and 21, the cover member 80, the vehicle speed detector 90, the pulser ring 98 and the mounting member 92 that have been described in Embodiment 4 are shown.

Additionally, since the other configurations of Embodiment 7 are made similar to those of Embodiment 6, like reference numerals will be given to like constituent portions, and the description thereof will be omitted.

Consequently, in Embodiment 7, too, substantially similar functions and advantages to those of Embodiment 4 are provided.

However, in Embodiment 7, even in case a failure in sealing by the cover member 80 occurs unexpectedly, resulting in the intrusion of muddy water or the like into the interior of the cover member 80, since the annular seal portion is configured by the close contact between the flat surfaces 73b, 78b of both the radially outer side annular portions on the end face of the hub shaft 13 of the wheel hub 10 and the end face of the outer ring 60 of the constant velocity joint 50, the muddy water or the like can be prevented from reaching clearances defined as a result of meshing of the side face splines 71b, 76b on both the radially inner side annular portions, thereby making it possible to prevent the rusting of the side face splines 71b, 76b which would otherwise be caused by the intrusion of muddy water or the like.

Additionally, in Embodiment 7 that has been described above, while the side face splines 71b, 76b are illustrated as being formed individually on both the radially inner side annular portions and the flat surfaces 73b, 78b, which configure the annular seal portion, are illustrated as being formed individually on both the radially outer side annular portions, a configuration may be adopted in which the side face splines 71b, 76b are formed individually on both the radially outer side annular portions and the flat surfaces 73b, 78b, which configure the annular seal portion, are formed individually on both the radially inner side annular portions.

Note that the invention is not limited to the embodiments that have been described heretofore.

In addition, the invention has been illustrated as the double row angular ball bearing 20 being adopted as the double row roller bearing, the invention can be implemented even in the event that a double row tapered roller bearing is used.

The invention claimed is:

1. A wheel supporting system comprising:
a wheel hub which includes a hub shaft defining an inside hole therein and to which a wheel is to be attached; and
a constant velocity joint which includes an outer ring including an outer ring shaft portion extended integrally from an end face of the outer ring,
wherein the wheel hub and the constant velocity joint are coupled together by the outer ring shaft portion being fittingly inserted into the inside hole of the hub shaft,
wherein internal splines and external splines are formed on an inner circumferential surface of the inside hole of the hub shaft and an outer circumferential surface of the outer ring shaft portion, respectively, in such a manner as to mesh with each other,
wherein side face splines are formed on an end face of the hub shaft and an end face of the outer ring of the constant velocity joint, respectively, in such a manner as to mesh with each other, and
wherein the wheel hub and the constant velocity joint are coupled together in such a manner that torque can be transmitted between the wheel hub and the constant velocity joint by the internal and external splines and the side face splines meshing with each other, respectively.

2. The wheel supporting system according to claim 1, wherein the side face splines formed on the end face of the hub shaft are integral with the internal splines.

3. The wheel supporting system according to claim 1, wherein the side face splines formed on the end face of the outer ring of the constant velocity joint are integral with the external splines, and
wherein the side face splines formed on the end face of the hub shaft are integral with the internal splines.

4. A wheel supporting system comprising:
a hub shaft of a wheel hub to which a wheel is to be attached; and
an outer ring of a constant velocity joint which is coupled to the hub shaft in such a manner that torque can be transmitted therebetween,
wherein a radially inner side annular portion and a radially outer side annular portion are provided both on an end face of the hub shaft and an end face of the outer ring of the constant velocity joint which is brought into abutment with the end face of the hub shaft,
wherein side face splines are formed individually on either annular portions of the radially inner side annular portions and the radially outer side annular portions in such a manner as to mesh with each other so that the wheel hub and the outer ring of the constant velocity joint can be coupled together in such a manner that torque can be transmitted between the wheel hub and the constant velocity joint, and
wherein flat surfaces are formed individually on the other annular portions in such a manner as to be brought into close contact with each other so as to form an annular seal portion.

5. The wheel supporting system according to claim 4, wherein the side face splines are formed individually on the radially inner side annular portions of the end face of the hub shaft and the end face of the outer ring of the constant velocity joint, and
wherein the flat surfaces are formed individually on the radially outer side annular portions in such a manner as to form the annular seal portion.

6. A wheel supporting system comprising:
a hub shaft of a wheel hub to which a wheel is to be attached; and
an outer ring of a constant velocity joint which is coupled to the hub shaft in such a manner that torque can be transmitted therebetween,
wherein side face splines are formed individually on an end face of the hub shaft and an end face of the outer ring of the constant velocity joint which is brought into abutment with the end face of the hub shaft in such a manner as to mesh with each other so that the wheel hub and the outer ring of the constant velocity joint can be coupled together in such a manner that torque can be transmitted between the wheel hub and the constant velocity joint,
wherein a cover member is mounted between an outer ring of a rolling bearing which is installed on an outer circumference of the hub shaft and the outer ring of the constant velocity joint in such a manner as to cover a meshing portion between the side face splines and a clearance defined between both the outer rings for sealing,
wherein a vehicle speed detector is disposed on the cover member or a vehicle body side member, and
wherein a pulser ring is installed in an interior of the cover member in such a manner as to face a detecting portion of the vehicle speed detector.

7. The wheel supporting system according to claim 6, wherein the cover member comprises:
a core metal including a cylindrical portion which is fittingly press fitted in an inner circumferential surface of the outer ring of the rolling bearing of the hub shaft, and an annular portion which projects from an end portion of the cylindrical portion towards an outer circumferential surface of the outer ring of the constant velocity joint; and
an elastic seal material which is joined integrally to the annular portion of the core metal and includes a distal end portion brought into close contact with the outer circumferential surface of the outer ring of the constant velocity joint.

8. The wheel supporting system according to claim 7, wherein an insertion hole which corresponds to the detecting portion of the vehicle speed detector is formed in the cylindrical portion of the core metal of the cover member, and
wherein the detecting portion comes close to an outer circumferential surface of the pulser ring by inserting the detecting portion of the vehicle speed detector into the insertion hole so as to be mounted on the cylindrical portion of the core metal.

9. The wheel supporting system according to claim 8, wherein a radially inner side annular portion and a radially outer side annular portion are provided on an end face of the hub shaft and a end face of the outer ring of the constant velocity joint which is brought into abutment with the end face of the hub shaft, wherein side face splines are formed individually on either annular portions of the radially inner side annular portion and the radially outer side annular portion in such a manner as to mesh with each other so that the wheel hub and the outer ring of the constant velocity joint can be coupled together in such a manner that torque can be transmitted between the wheel hub and the constant velocity joint, and wherein flat surfaces are formed individually on the other annular portions in such a manner as to be brought into close contact with each other so as to form an annular seal portion.

10. The wheel supporting system according to claim 7, wherein the core metal of the cover member is formed of a non-magnetic material, wherein the detecting portion of the vehicle speed detector is installed to lie close to an outer circumferential surface of the cylindrical portion of the core metal, and wherein the pulser ring made up of a magnetized ring is installed in a position which corresponds to the detecting portion of the vehicle speed detector and in such a manner as to lie close to an inner circumferential surface of the cylindrical portion of the core metal.

11. The wheel supporting system according to claim 10, wherein a radially inner side annular portion and a radially outer side annular portion are provided on an end face of the hub shaft and an end face of the outer ring of the constant velocity joint which is brought into abutment with the end face of the hub shaft, wherein side face splines are formed individually on either annular portions of the radially inner side annular portion and the radially outer side annular portion in such a manner as to mesh with each other so that the wheel hub and the outer ring of the constant velocity joint can be coupled together in such a manner that torque can be transmitted between the wheel hub and the constant velocity joint, and wherein, flat surfaces are formed individually on the other annular portions in such a manner as to be brought into close contact with each other so as to form an annular seal portion.

12. The wheel supporting system according to claim 7, wherein a radially inner side annular portion and a radially outer side annular portion are provided on an end face the hub shaft and end face of the outer of the constant velocity joint which is brought into abutment with the end face of the hub shaft, wherein side face splines are formed individually on either annular portions of the radially inner side annular portion and the radially outer side annular portion in such a manner as to mesh with each other so that the wheel hub and the outer ring of the constant velocity joint can be coupled together in such a manner that torque can be transmitted between the wheel hub and the constant velocity joint, and wherein flat surfaces are formed individually on the other annular portions in such a manner as to be brought into close contact with each other so as to form an annular seal portion.

13. The wheel supporting system, according to claim 6, wherein a radially inner side annular portion and a radially outer side annular portion are provided on an end face of the hub shaft and an end face of the outer ring of the constant velocity joint which is brought into abutment with the end face of the hub shaft, wherein side face splines are formed individually on either annular portions of the radially inner side annular portion and the radially outer side annular portion in such a manner as to mesh with each other so that the wheel hub and the outer ring of the constant velocity joint can be coupled together in such a manner that torque can be transmitted between the wheel hub and the constant velocity joint, and wherein flat surfaces are formed individually on the other annular portions in such a manner as to be brought into close contact with each other so as to form an annular seal portion.

14. The wheel supporting system according to claim 13, wherein the flat surfaces are formed on the radially inner side annular portions.

15. The wheel supporting system according to claim 13, wherein the flat surfaces are formed on the radially outer side annular portions.

* * * * *